(12) United States Patent
Pun et al.

(10) Patent No.: US 8,797,213 B2
(45) Date of Patent: Aug. 5, 2014

(54) METHODS AND SYSTEMS FOR ESTIMATING ANGLE OF ARRIVAL

(75) Inventors: Ka Shun Carson Pun, San Diego, CA (US); Alfred Grau Besoli, Irvine, CA (US); Jesus Castaneda, Los Angeles, CA (US); Brima Ibrahim, Aliso Viejo, CA (US); David Garrett, Tustin, CA (US); Siukai Mak, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 716 days.

(21) Appl. No.: 12/895,497

(22) Filed: Sep. 30, 2010

(65) Prior Publication Data

US 2011/0074633 A1    Mar. 31, 2011

Related U.S. Application Data

(60) Provisional application No. 61/247,409, filed on Sep. 30, 2009.

(51) Int. Cl.
*G01S 5/04* (2006.01)

(52) U.S. Cl.
USPC .......................................... 342/442; 342/445

(58) Field of Classification Search
CPC ........................................................ G01S 1/02
USPC .................. 342/432, 423, 445, 442, 436, 437
See application file for complete search history.

(56) References Cited

U.S. PATENT DOCUMENTS

| | | | | |
|---|---|---|---|---|
| 5,457,466 | A * | 10/1995 | Rose | 342/442 |
| 6,411,257 | B1 * | 6/2002 | Sorelius et al. | 342/378 |
| 6,489,923 | B1 * | 12/2002 | Bevan et al. | 342/378 |
| 6,697,644 | B2 | 2/2004 | Scherzer et al. | |
| 8,358,723 | B1 * | 1/2013 | Hamkins et al. | 375/341 |
| 2010/0295730 | A1 * | 11/2010 | Jeon | 342/372 |
| 2011/0068980 | A1 * | 3/2011 | Vered et al. | 342/432 |

* cited by examiner

*Primary Examiner* — Dao Phan
(74) *Attorney, Agent, or Firm* — Sterne, Kessler, Goldstein & Fox P.L.L.C.

(57) ABSTRACT

Methods and systems for estimating an angle of arrival are provided. In an embodiment, a system for estimating angle of arrival includes a snapshot determining module configured to receive a signal from each antenna of an antenna array and to generate a snapshot vector including values based on the signals and an angle of arrival processing module configured to estimate an angle of arrival for the electromagnetic signal relative to the antenna array based on the snapshot vector. Each signal is representative of an electromagnetic signal incident on a respective antenna of the antenna array and each value is representative of a phase of a respective signal.

51 Claims, 22 Drawing Sheets

300

$$X_n = \begin{bmatrix} A_1 e^{j\Phi_1} \\ \vdots \\ A_n e^{j\Phi_n} \end{bmatrix}$$

FIG. 3

$$R_{nn} = \begin{bmatrix} R_1 & R_{1,2}e^{j\Delta\Phi_{1,2}} & R_{1,3}e^{j\Delta\Phi_{1,3}} & \cdots \\ R_{2,1}e^{j\Delta\Phi_{2,1}} & R_2 & R_{2,3}e^{j\Delta\Phi_{2,3}} & R_{2,4}e^{j\Delta\Phi_{2,4}} & \cdots \\ R_{3,1}e^{j\Delta\Phi_{3,1}} & R_{3,2}e^{j\Delta\Phi_{3,2}} & R_3 & R_{3,4}e^{j\Delta\Phi_{3,4}} & \cdots \\ \vdots & R_{4,2}e^{j\Delta\Phi_{4,2}} & R_{4,3}e^{j\Delta\Phi_{4,3}} & R_4 & \cdots \\ & \vdots & \vdots & \vdots \end{bmatrix}$$

FIG. 21

METHODS AND SYSTEMS FOR ESTIMATING ANGLE OF ARRIVAL

CROSS REFERENCE TO RELATED APPLICATIONS

This application claims the benefit of U.S. Provisional Appl. No. 61/247,409, filed Sep. 30, 2009, which is incorporated by reference herein in its entirety.

BACKGROUND

1. Field

Embodiments described herein generally relate to determining characteristics of a received electromagnetic signal.

2. Background

In gaming environments, users control handheld transmitters, which interact with a console and the console can control a display (e.g., a television). Through the handheld transmitters, users can control the operation of a game. For example, the user can push certain buttons on the handheld transmitter to control the actions of a character in a game. These actions are then reflected on the display.

In an effort to enhance the gaming experience, system designers can strive to give users a more "real" feel. One method of accomplishing this is to allow a user's movements to be reflected in the game. However, the methods that allow for user's movements to be determined at the console (and therefore reflected in the game) can often be limited.

BRIEF SUMMARY

Methods and systems for estimating an angle of arrival of one or more signals are provided. In an embodiment, a system for estimating angle of arrival includes a snapshot determining module configured to receive a signal from each antenna of an antenna array and to generate a snapshot vector including values based on the signals and an angle of arrival processing module configured to estimate an angle of arrival for the electromagnetic signal relative to the antenna array based on the snapshot vector. Each signal is representative of an electromagnetic signal incident on a respective antenna of the antenna array and each value is representative of a phase of a respective signal.

In another embodiment, a method for estimating angle of arrival includes receiving a signal from each antenna of an antenna array, generating a snapshot vector including values based on the signals, and estimating an angle of arrival for the electromagnetic signal relative to the antenna array based on the snapshot vector. Each signal is representative of an electromagnetic signal incident on a respective antenna of the antenna array and each value is representative of a phase of a respective signal.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 3 shows a snapshot vector, according to an embodiment of the present invention.

FIG. 21 shows a diagram of a covariance matrix including sub-matrices, according to an embodiment of the present invention.

The present invention will be described with reference to the accompanying drawings. Generally, the drawing in which an element first appears is typically indicated by the leftmost digit(s) in the corresponding reference number.

DETAILED DESCRIPTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

I. OVERVIEW

In embodiments described herein, methods and systems are provided that allow for a receiver to estimate an angle of arrival for a received electromagnetic signal. For example, in a gaming environment, such an angle can be the angle of a handheld transmitter relative to an antenna array coupled to a game console. The antenna array can be coupled to the game console through a wireless coupling, wired coupling, or a combination thereof. By estimating the angle of the handheld transmitter relative to the antenna array, movements of a user using the handheld transmitter can be tracked at the game console.

Figure 1:
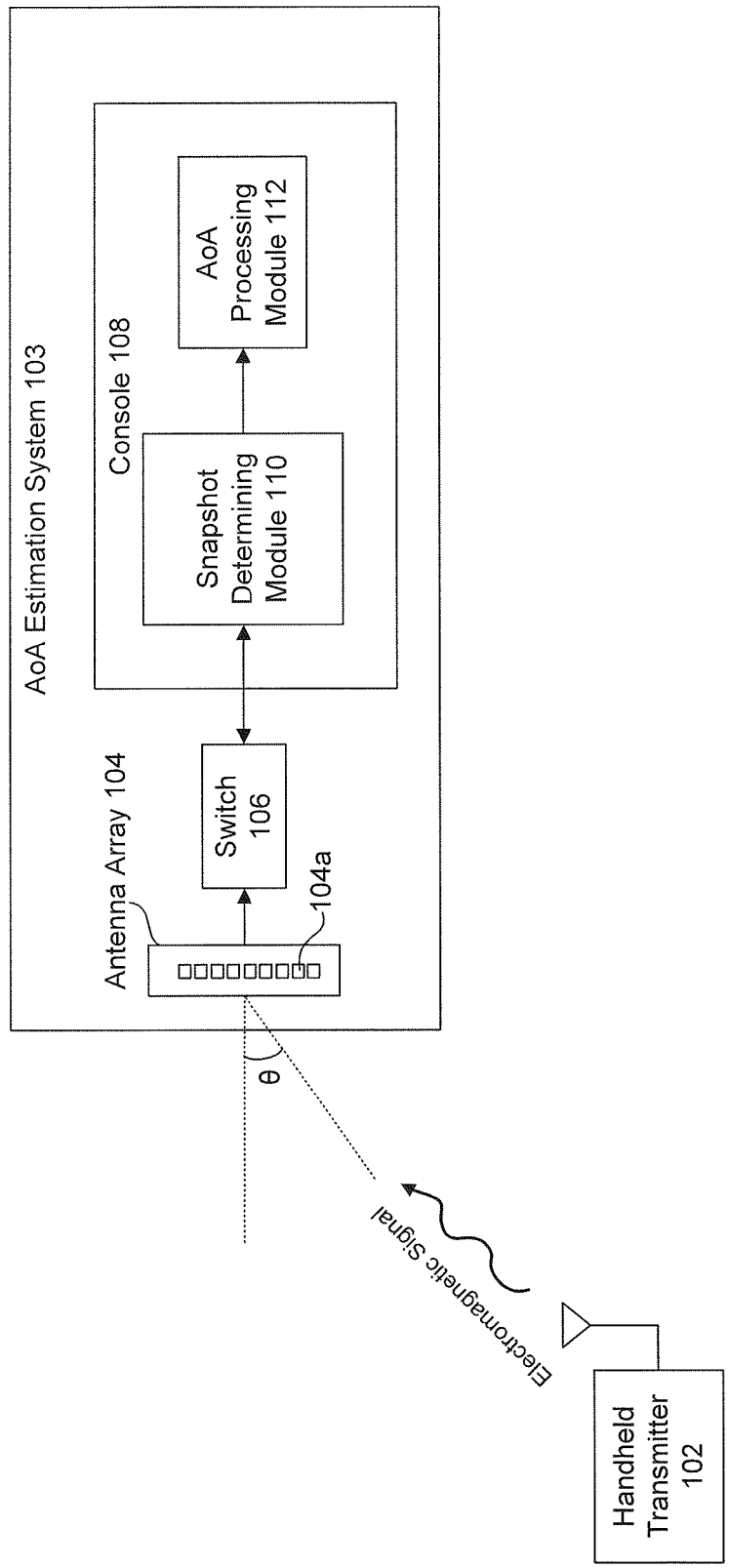
FIG. 1 shows a diagram of a wireless system, according to an embodiment of the present invention.

FIG. 1 shows a diagram of a wireless system 100, according to an embodiment of the present invention. System 100 includes a handheld transmitter 102 and an angle of arrival estimation (AoA) system 103. In an embodiment, wireless system 100 can be a gaming system. In such an embodiment, handheld transmitter 102 can be controlled by a user playing a game using the system.

Handheld transmitter 102 transmits an electromagnetic signal to AoA estimation system 103. In an embodiment, handheld transmitter 102 can be a Bluetooth (BT) transmitting device and the electromagnetic signal can include a BT packet. In the embodiment of FIG. 1, system 100 includes one handheld transmitting device 102. In other embodiments, system 100 includes multiple handheld transmitters.

AoA estimation system 103 includes an antenna array 104, a switch 106, and a console 108. Console 108 includes a snapshot determining module 110 and an AoA processing module 112. Antenna array 104, switch 106, and console 108 can be included in a single device. In other embodiments, one or more of antenna array 104, switch 106, and console 108 can be included in separate devices.

One or more elements of console 108 can be implemented as hardware, software, firmware, or a combination thereof. For example, snapshot determining module 108 can be implemented using programmable hardware (e.g., a field programmable gate array (FPGA)). In another embodiment, angle of arrival processing module 112 can be implemented as software running on a processor, e.g., a digital signal processor (DSP). The operation of system 100 will be described with reference to method 200.

Figure 2:
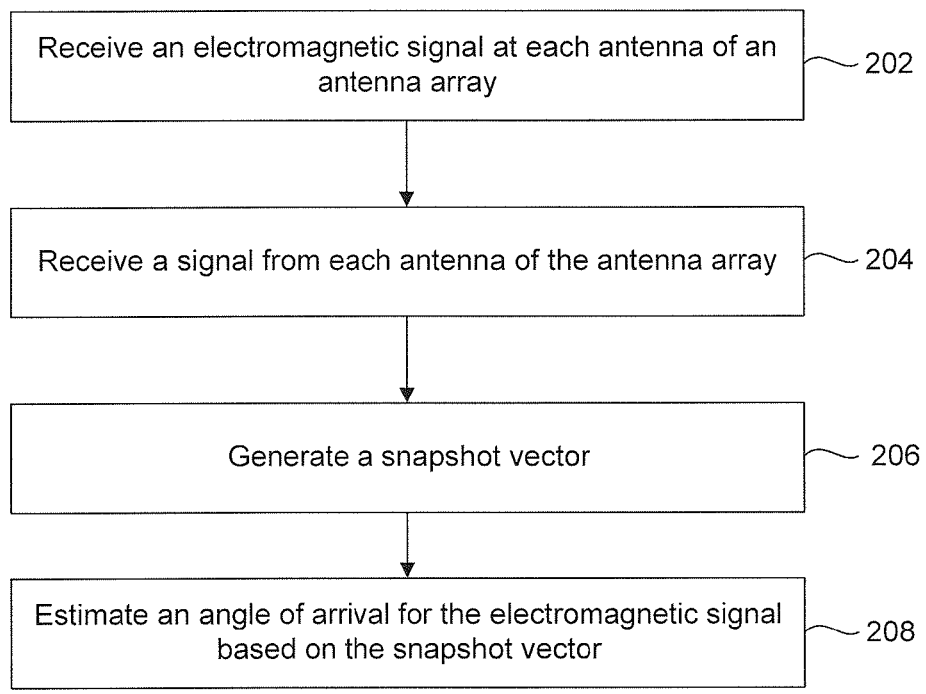
FIG. 2 is a flowchart of an exemplary method of estimating angle of arrival, according to an embodiment of the present invention.

FIG. 2 is a flowchart of an exemplary method 200 of estimating angle of arrival, according to an embodiment of the present invention. Other structural and operational embodiments will be apparent to persons skilled in the relevant art(s) based on the following discussion. Flowchart 200 is described with reference to the embodiment of FIG. 1. However, flowchart 200 is not limited to that embodiment. The steps shown in FIG. 2 do not necessarily have to occur in the order shown. The steps of FIG. 2 are described in detail below.

In step 202, an electromagnetic signal is received at each antenna of an antenna array. For example, in FIG. 1, handheld transmitter 102 transmits an electromagnetic signal that is received by each antenna of antenna array 104. As described above, handheld transmitter 102 can be a BT transmitter and the electromagnetic signal can include a BT packet.

In step 204, a signal is received from each antenna of the antenna array. For example, in FIG. 1, each antenna of antenna array 104 can generate an electrical signal in response to the incident electromagnetic signal. Snapshot determining module 110 of console 108 receives each of the generated electrical signals. For example, switch 106 can receive all of the electrical signals generated by the antennas of antenna array 104 as inputs. Snapshot determining module 110, which receives the output of switch 106, can control switch 106 to switch its output between the different generated signals so that individual signals can be processed. In another embodiment, the generated signals can be downconverted into baseband complex IQ signals before being received by snapshot determining module 110.

In step 206, a snapshot vector is generated. For example, in FIG. 1, snapshot determining module 110 determines a snapshot vector based on the electrical signals received from each of the antennas of antenna array 104.

FIG. 3 shows a snapshot vector 300, according to an embodiment of the present invention. Snapshot vector 300 is a column vector that includes n values, $A_1 e^{j\phi_1}$-$A_n e^{j\phi_n}$, where n is the number of antennas in antenna array 104. For example, in one embodiment, n can be 9. Each entry in the snapshot vector represents the amplitude and phase of the electromagnetic signals received at the individual antennas of antenna array 104. Each of the values of snapshot vector 300 includes phase information $\phi$, which is representative of the phase delay of the electromagnetic signal received at the respective antenna of antenna array 104. For example, phase information $\phi_2$ can be representative of the phase delay on the second antenna 104a of antenna array 104 in receiving the electromagnetic signal.

In an embodiment, each antenna of antenna array 104 receives the electromagnetic signal. However, because of the spacing between the antennas, there is a time delay between one antenna receiving the electromagnetic signal and other antennas receiving the electromagnetic signal. This time delay is reflected in the phase delay between the electromagnetic signal incident on the different antennas of the array.

In step 208, an angle of arrival for the electromagnetic signal is estimated based on the snapshot vector. For example, in FIG. 1, AoA processing module 112 estimates the angle of arrival for electromagnetic signal based on the received the snapshot vector. In an embodiment, the angle of arrival can be relative to the antenna array. For example, in FIG. 1, the angle of arrival can refer to the angle $\theta$ relative to antenna array 104.

Figure 4:
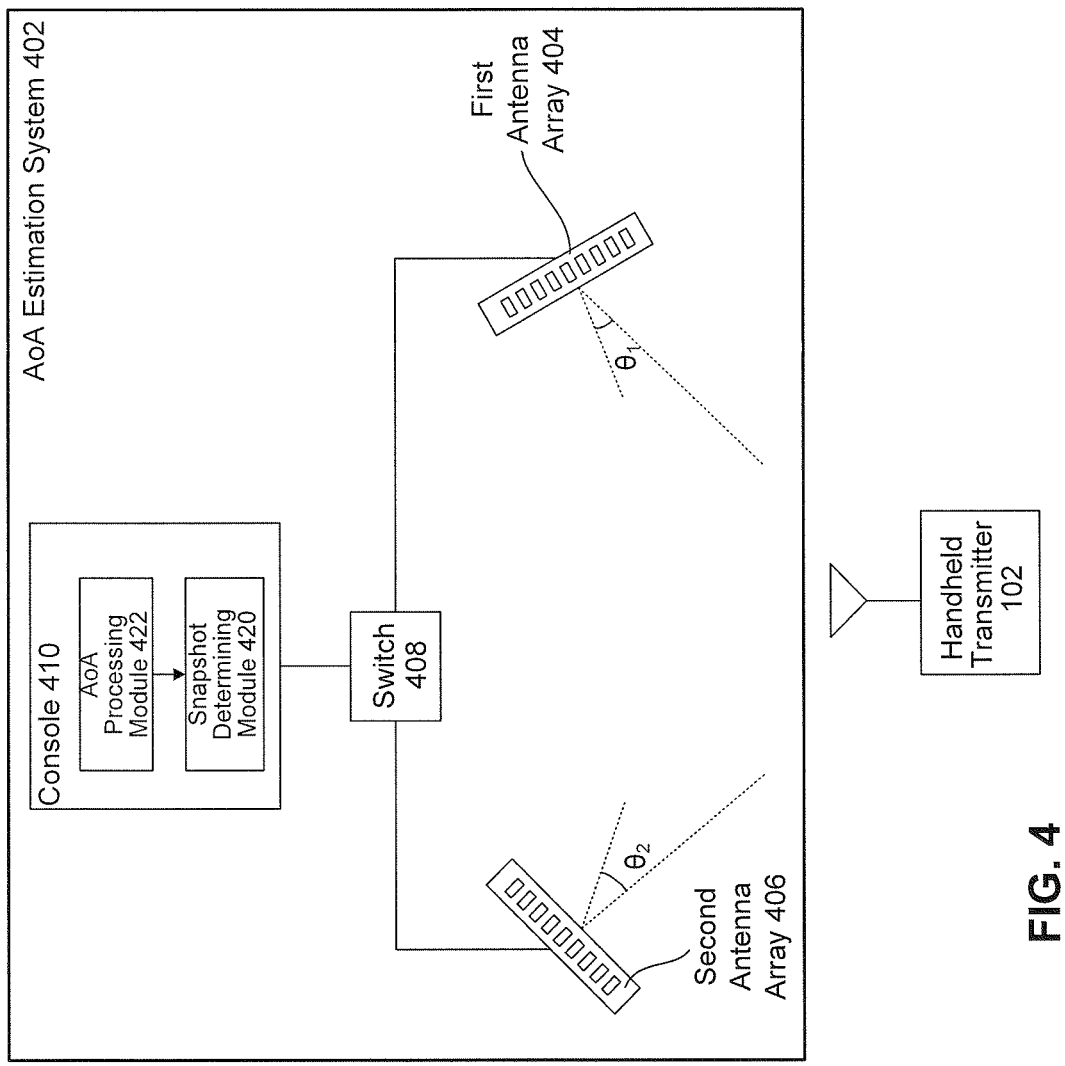
FIG. 4 shows a diagram of a wireless system having two antenna arrays, according to an embodiment of the present invention.

FIG. 4 shows a diagram of a wireless system 400, according to an embodiment of the present invention. System 400 includes handheld transmitting device 102 and an AoA estimation system 402. AoA estimation system 402 includes a first antenna array 404, a second antenna array 406, a switch 408, and a console 410. Console 410 includes a snapshot determining module 420 and an AoA processing module 422.

Switch 408 and console 410 can be similar to switch 106 and console 108, respectively, shown in FIG. 1. However, unlike system 100, system 400 includes two antenna arrays. AoA estimation system 402, then, can be used to determine an angle of arrival relative to first antenna array 404 and another angle of arrival relative to second antenna array 408.

Snapshot determining module 420 can control switch 408 to switch between first electrical signals generated by the antennas of first antenna array 404 and then between second electrical signals generated by the antennas of second antenna array 406. Snapshot determining module 420 determines a first snapshot vector, including first values, based on the first electrical signals and a second snapshot vector, including second values, from the second electrical signals. From the first and second snapshot vectors, AoA processing module 422 can estimate an angle of arrival relative to first array 404 (labeled as $\theta_1$ in FIG. 4) and an angle of arrival relative to second array 406 (labeled as $\theta_2$ in FIG. 4).

In a further embodiment, the horizontal distance between first antenna array 404 and second antenna array 406 is known at console 410 (e.g., the distance can be stored in a memory of console 410 (not shown)). In such an embodiment, estimated angles $\theta_1$ and $\theta_2$ can be used to estimate a position of handheld transmitter 102. For example, AoA processing module 422 can be further configured to use a mathematical relationship, such as the law of cosines, to estimate the 2-D position of handheld transmitter 102 from the two angles of arrival, as would be appreciated by those skilled in the art based on the description herein. Stated another way, the angle of arrival and range to the handheld transmitter could be determined.

In another embodiment, AoA estimation system 402 can further include a third antenna array (not shown) and an angle of arrival relative to the third antenna array can be estimated. The estimated angles of arrival relative to the first, second, and third arrays can be used to estimate a 3-D position of handheld transmitter 102 (e.g., using a mathematical relationship, as described above).

Figure 5:
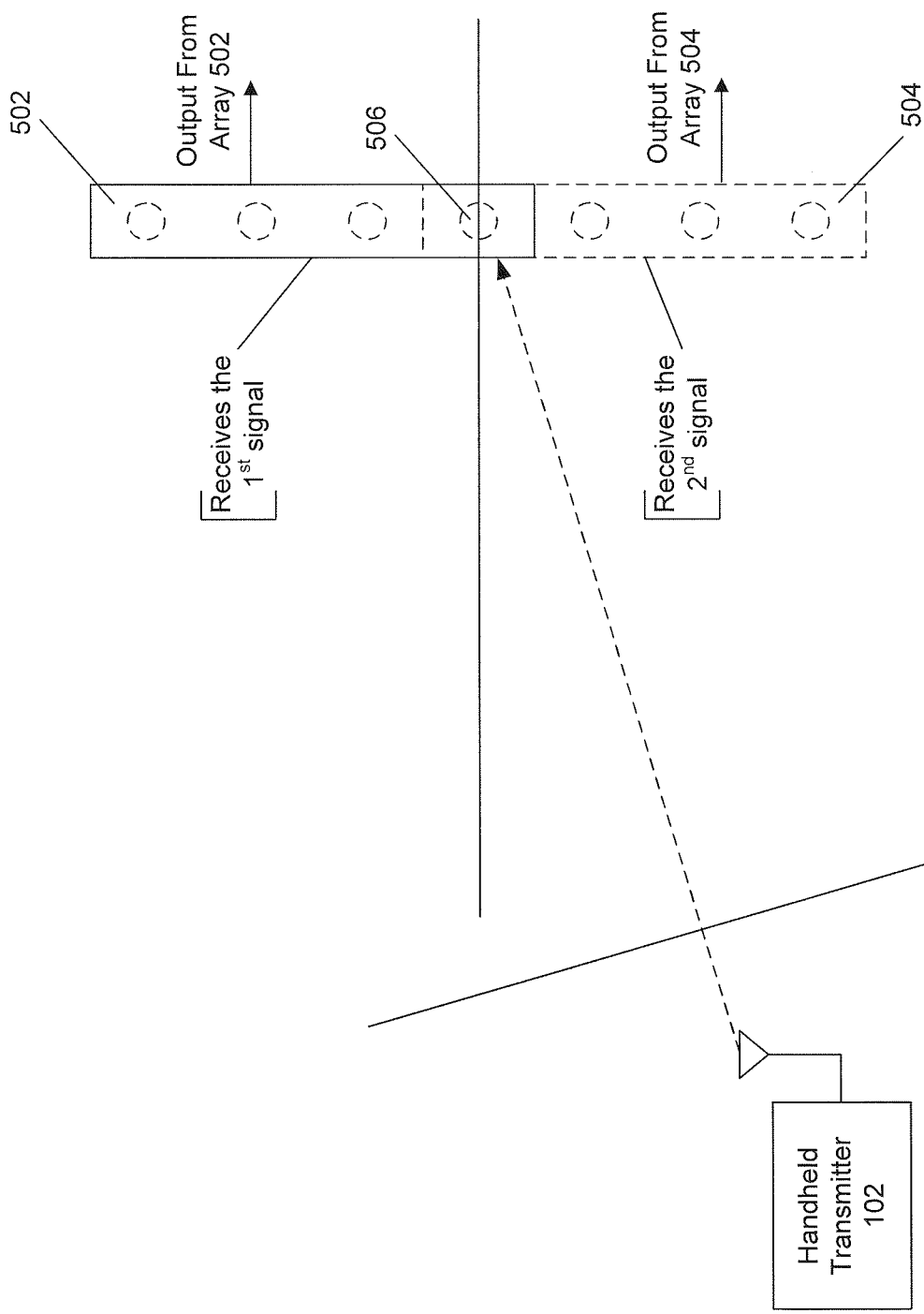
FIG. 5 shows a diagram of an antenna array configuration having two antenna arrays, according to an embodiment of the present invention.

In some situations, the number of antennas in an antenna array can be limited by the length of the received electromagnetic signal, thereby limiting the resolution of the angle of arrival estimate. To increase the number of antennas that can be used to estimate the angle of arrival, two antenna arrays can be used. For example, FIG. 5 shows an antenna array configuration 500 that includes a first antenna array 502 and a second antenna array 504, according to an embodiment of the present invention. As shown in FIG. 5, handheld transmitter 102 can transmit first and second electromagnetic signals. When the first electromagnetic signal is received at first antenna array 502, first signals generated by the antennas of first antenna array 504 can be analyzed and first values for a snapshot vector can be determined. When the second electromagnetic signal is received at second array 504, second signals generated by the antennas of second antenna array 504 are analyzed and values can be determined. The first and second values can then be combined into a single snapshot vector from which an angle of arrival is estimated.

First and second antenna arrays 502 and 504 overlap. That is, first and second antenna arrays both include at least one common antenna. For example, as shown in FIG. 5, first and second antenna arrays both include antenna 506. Both first and second sets of values, then, will include a value determined based on the signals received at antenna 506. In an embodiment, before the angle of arrival is estimated based on the snapshot vector including the first and second sets of values, the value respective to antenna 506 is removed from either the first set of values or second set of values so that the contribution from antenna 506 is not double counted. Furthermore, either the value respective to antenna 506 in the first set or the value respective to the antenna 506 in the second set of values can be used to normalize the snapshot vector before the angle of arrival estimation.

In the embodiment, handheld transmitter 102 transmits electromagnetic signals rapidly relative to the movement of a user holding handheld transmitter 102. In such an embodiment, handheld transmitter 102 may not have moved substantially between when the first electromagnetic signal was transmitted and when the second electromagnetic signal was transmitted. Thus, the value respective to antenna 506 in the first set and the value respective to the antenna 506 in the second set can be assumed to be substantially equal.

Thus, in the embodiments shown in FIGS. 4 and 5 multiple antenna arrays can be used to gain more information about the handheld transmitter (e.g., position) or can be used to increase the resolution of the angle of arrival estimation.

II. ANTENNA ARRAY

As described above, each antenna of the antenna array generates an electrical signal in response to the incident electromagnetic signal. In one embodiment, the antennas in the antenna array are circularly polarized. When linearly polarized receive antennas are used, the transmitting and receiving antennas may be misaligned. The result is that little or no power is received at the receiver. Using a circularly polarized antenna, on the other hand, results in a predictable −3 dB loss for all possible alignments of a linearly polarized transmitting antenna (e.g., of the handheld transmitter). Thus, the use of a circularly polarized receiving antenna can reduce possible effects of antenna misalignment.

In a further embodiment, the handheld transmitter can include a circularly polarized antenna. Using transmitting and receiving antennas that are both circularly polarized may reduce multipath effects. Specifically, if both the transmitting and receiving antennas are circularly polarized, then only the line of sight (LOS) path and the paths including an even number of reflections are properly received at the receiving antenna. Thus, the paths between the transmitting and receiving antennas that include an odd number of reflections would not contribute to the received signal.

Figure 6:
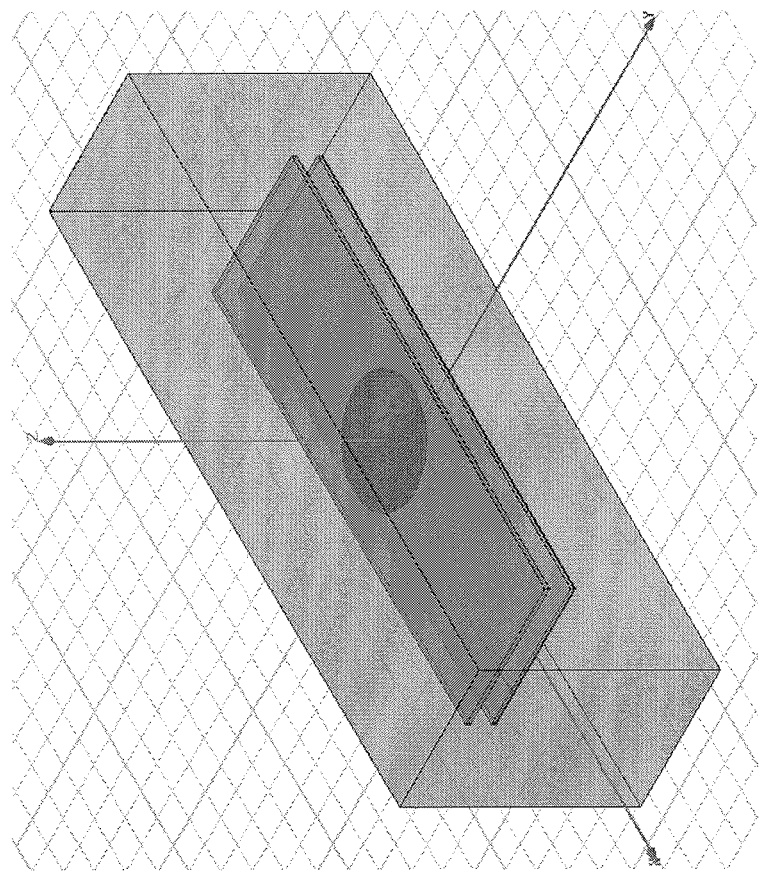
FIGS. 6 and 7 show perspective and top views, respectively, of an antenna according to embodiments of the present invention.
Figure 7:
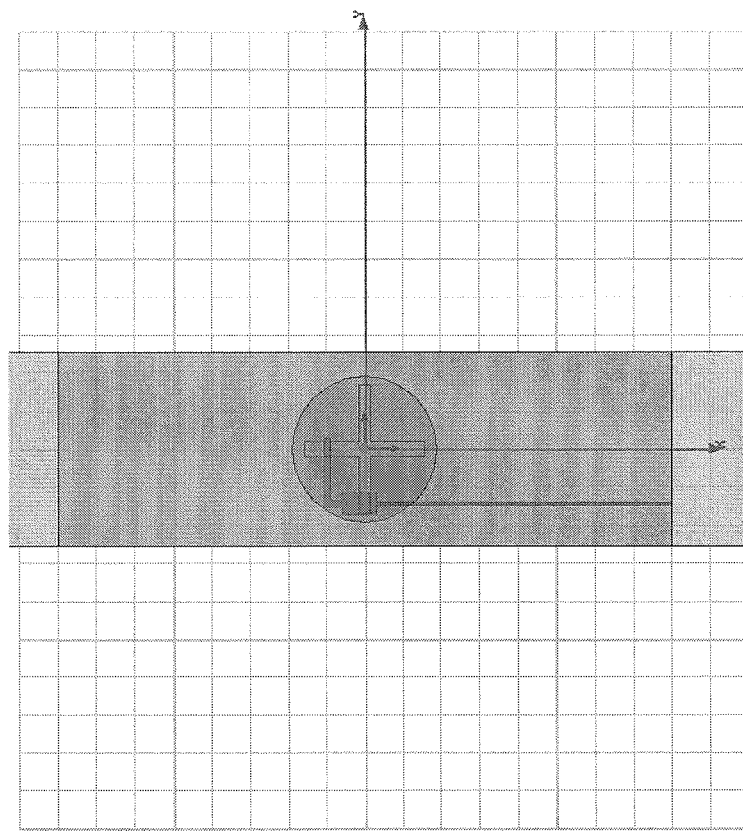

FIGS. 6 and 7 show perspective and top views, respectively, of an antenna 600 according to embodiment of the present invention. For example, antenna 600 may be used as one or more of the antennas that make up an antenna array or used in a handheld transmitter. As shown in FIGS. 6 and 7, antenna 600 includes two circuit boards separated by an air gap and is fed with a microstrip line with a slot.

In addition to being circularly polarized, antenna 600 also has additional beneficial characteristics. For example, antenna 600 can be manufactured to be relatively thin, e.g., 1 cm. Also, antenna 200 can be a broadband antenna. For example, antenna 600 may be able to operate over the entire BT frequency band. Moreover, antenna 600 can also be highly directive, transmitting and receiving along the positive Z axis.

Figure 8:
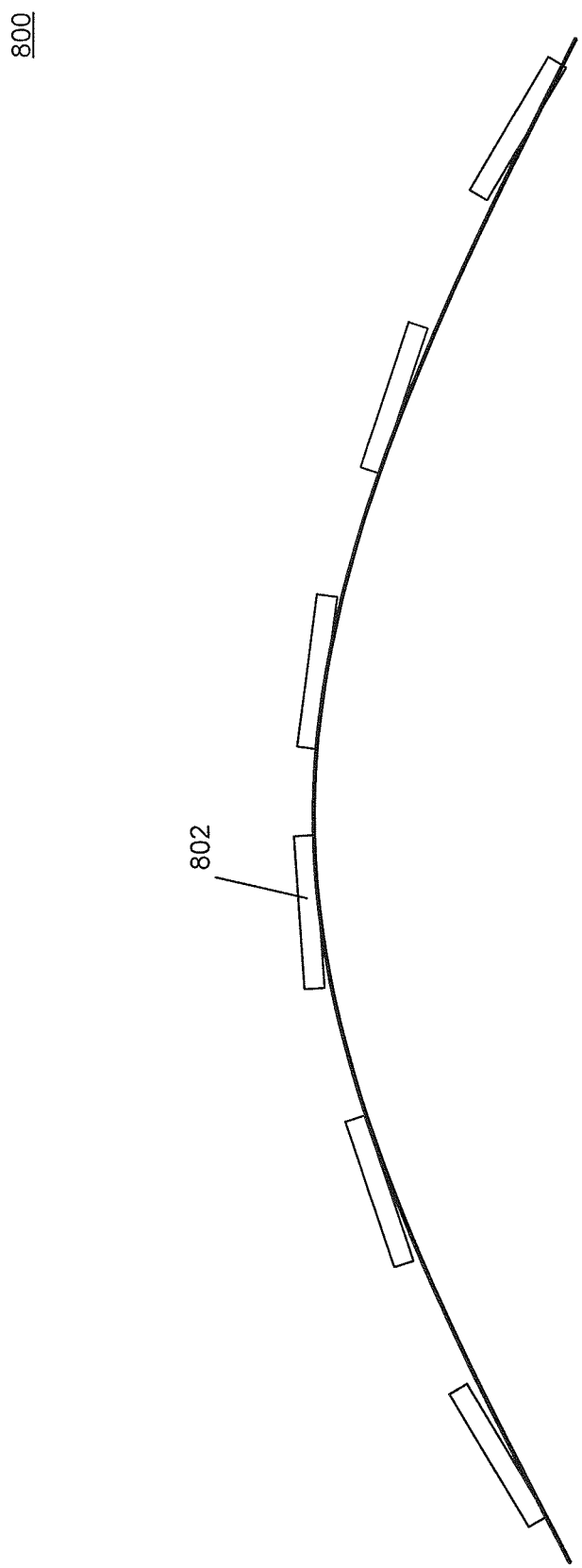
FIG. 8 shows an antenna array arranged in a conical shape, according to an embodiment of the present invention.

In an embodiment, the antenna array includes antennas in a straight line that are separated by a uniform distance, i.e., the antenna array is a uniformly spaced linear array. In such an embodiment, the antenna array can be especially good at estimating the angle of arrival when the electromagnetic signal is received substantially normal to the antenna array. Other angles, e.g., larger angles, may be more difficult estimate using a uniformly spaced linear array. In an embodiment, antennas that make up the antenna array can be distributed along a curved line or arranged in different shapes to improve the estimation of larger angles. For example, FIG. 8 shows an antenna array 800 including patch antennas 802, according to an embodiment of the present invention. In an embodiment, one or more of antenna array 104, first antenna array 404, or second antenna array 406 can be implemented as antenna array 800. As shown in FIG. 8, antennas included in antenna array 800 are distributed along a curved line. In an embodiment, an antenna array arranged like antenna array 800 can allow large angles of arrivals to be estimated with better accuracy (e.g., angle close to −90 or +90 degrees). In another embodiment, antennas can be distributed over a 2-D plane. For example, a pair of lines one behind the other. In another embodiment, antennas that make up antenna array can be spaced in a non-uniform manner to allow large angles to be resolved with greater accuracy.

III. SNAPSHOT DETERMINING MODULE

Figure 9:
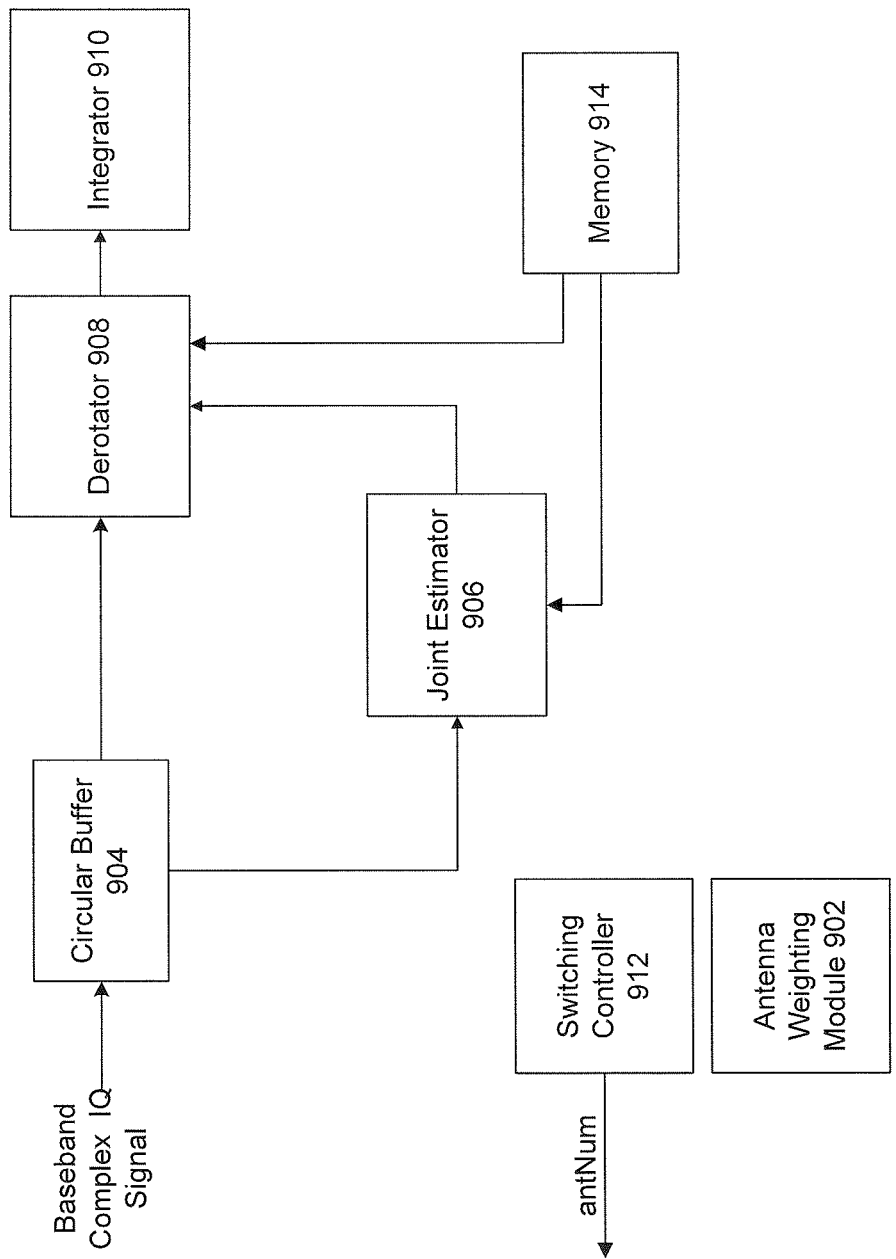
FIG. 9 shows a block diagram of a snapshot determining module, according to an embodiment of the present invention.

FIG. 9 shows a block diagram of a snapshot determining module 900, according to an embodiment of the present invention. Snapshot determining module 900 includes an antenna weighting module 902, a buffer 904, a joint estimator 906, a derotator 908, an integrator 910, a switching controller 912, and a memory 914.

Snapshot determining module 900 can be implemented as software, hardware, firmware, or a combination thereof. For example, snapshot determining module can be implemented in hardware using a FPGA. Either of snapshot determining module 110 or snapshot determining module 420 can be implemented as snapshot determining module 900.

Snapshot determining module 900 receives a baseband complex IQ signal. In an embodiment, the signal output by the switch (e.g., switch 106 or 408) can be first received by a BT downconverter. The downcoverter downcoverts the output of the switch to generate a complex IQ baseband signal that is received by snapshot determining module 900. Snapshot determining module 900 is configured to determine a snapshot vector based on the received baseband complex IQ signal.

In an embodiment, received baseband complex IQ signal can be represented as:

$e^{j(\Phi_{BP}+\Phi_{FO}+\Phi_{PhaseDelay})}$, where:

$\Phi_{BP}$ is phase contribution of the modulated bit pattern,
$\Phi_{FO}$ is the phase contribution of the frequency offset, and
$\Phi_{PhaseDelay}$ is the phase contribution of the phase delay between antennas in the antenna array.

As described above, the $i^{th}$ value of the snapshot vector, corresponding to the $i^{th}$ antenna of the array, can be expressed as $A_i e^{j(\Phi_i)}$, where $\Phi i$ is the phase delay of the electromagnetic signal on the $i^{th}$ antenna of the antenna array. To determine each $\Phi i$, snapshot determining module 900 is configured to receive a sample of the received baseband complex IQ signal generated by each antenna of the array, and, for each sample, remove the phase contribution of from the modulated bit pattern, $\Phi_{BP}$, and the phase contribution of the frequency offset, $\Phi_{FO}$, to obtain $\Phi_{PhaseDelay}$ for the respective antenna of the antenna array.

At a high level, snapshot determining module 900 is configured to estimate properties of the received signal (e.g., the modulation index and the frequency offset). Snapshot determining module 900 then uses the estimated properties to generate an estimated $\Phi_{BP}$ and an estimated $\Phi_{FO}$ for each sample. Finally, snapshot determining module 900 removes the estimated $\Phi_{BP}$ and $\Phi_{FO}$ from the phase of each sample to estimate a $\Phi_{PhaseDelay}$ for each sample. The operation of snapshot determining module 900 will be described in greater detail below.

Figure 10:
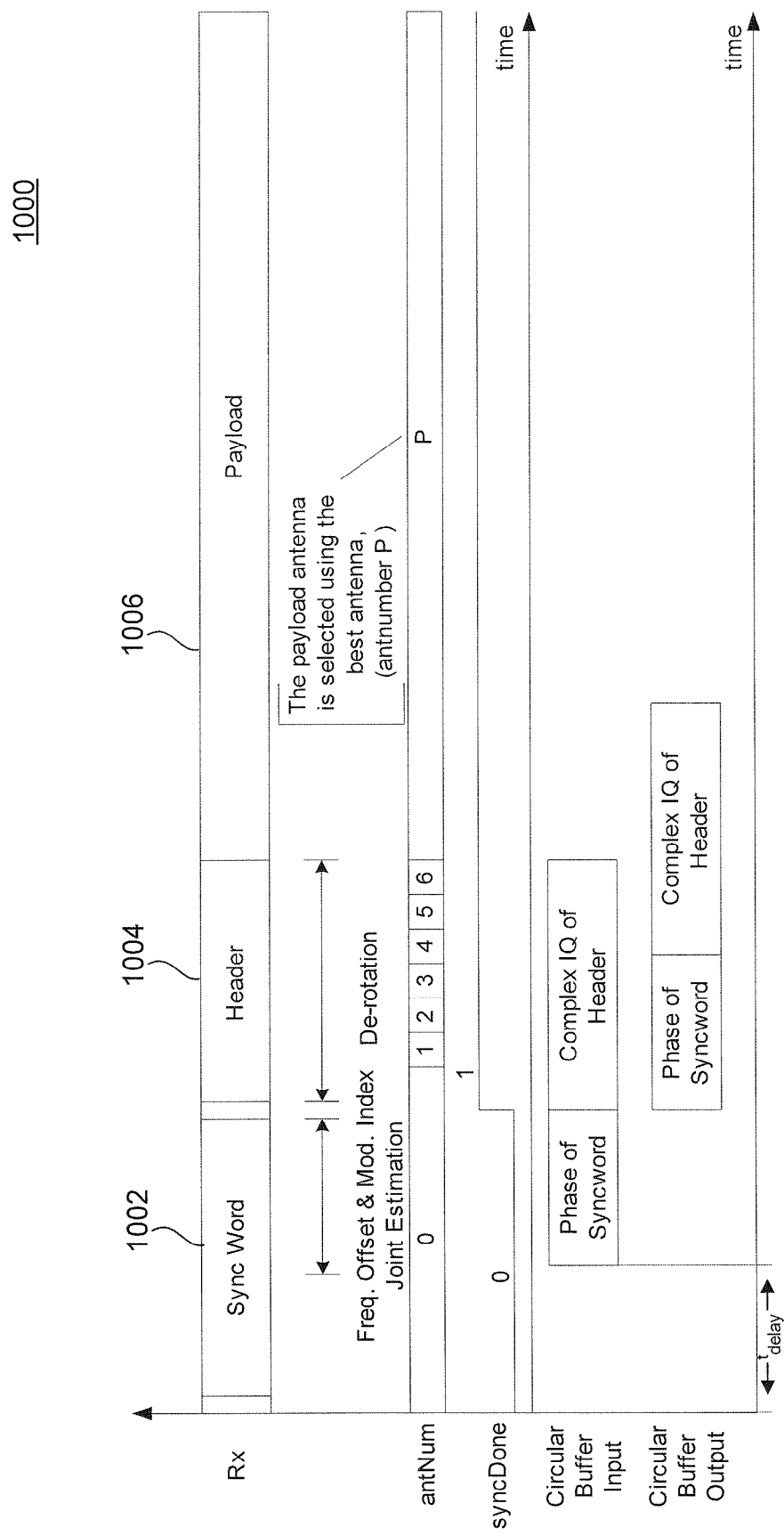
FIG. 10 shows a diagram of a Bluetooth packet, according to an embodiment of the present invention.

As noted above, a received electromagnetic signal can include a BT packet. Thus, each of the baseband complex IQ signals will include the BT packet. FIG. 10 shows a diagram of a BT packet 1000 that can be included in the received electromagnetic signal, according to an embodiment of the present invention. As shown in FIG. 10, BT 1000 packet includes a syncword 1002, a header 1004, and a payload 1006.

Figure 11:
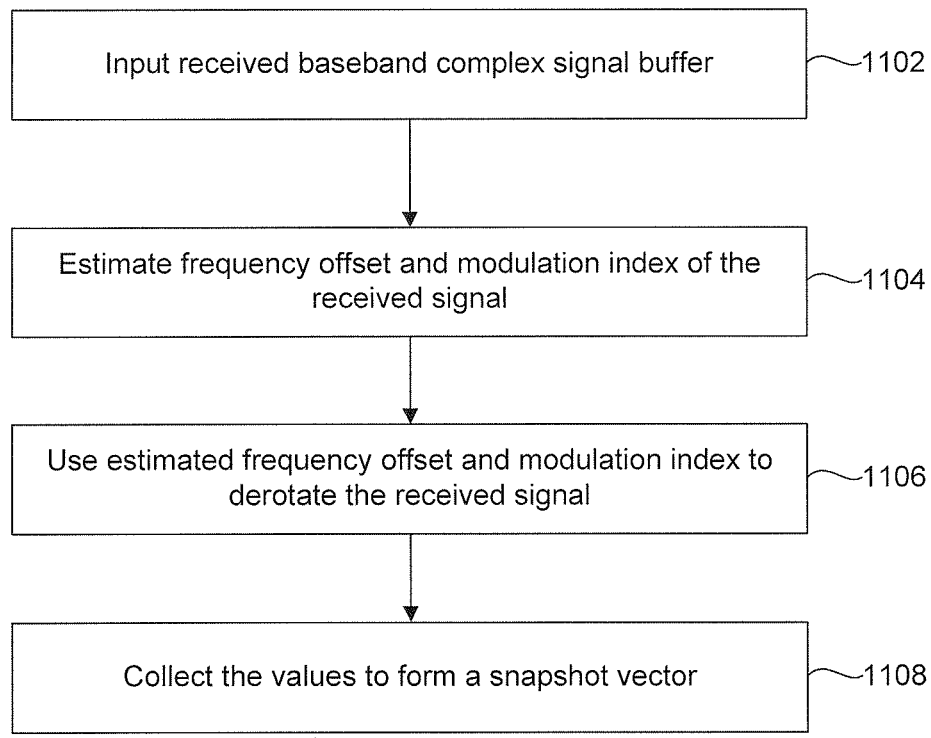
FIG. 11 is a flowchart of an exemplary method of determining a snapshot vector, according to an embodiment of the present invention.

FIG. 11 is a flowchart of an exemplary method 1100 of determining a snapshot vector, according to an embodiment of the present invention. Other structural and operational embodiments will be apparent to persons skilled in the relevant art(s) based on the following discussion. Flowchart 1100 is described with reference to the embodiment of FIG. 9. However, flowchart 1100 is not limited to that embodiment. The steps shown in FIG. 11 do not necessarily have to occur in the order shown. The steps of FIG. 11 are described in detail below.

In step 1102, the complex IQ baseband signal is buffered. For example, in FIG. 9, the received complex IQ baseband signal is buffered into circular buffer 904. As shown in FIG. 10, buffering the complex IQ baseband signal creates a delay (labeled "$t_{delay}$") between the reception of the complex IQ baseband signal and the operation of snapshot determining module 900. Once circular buffer 904 is filled, outputs of circular buffer 904 are read out to other elements of snapshot determining module 900 (e.g., joint estimator 906 and derotator 908).

In step 1104, a frequency offset and modulation index of the received BT packet are estimated. For example, in FIG. 9 joint estimator 906 estimates the frequency offset and modulation index during syncword 1002 of BT packet 1000. As shown in FIG. 10, joint estimator 906 waits until circular buffer 904 is filled and begins outputting portions of syncword 1002 before performing the joint estimation operation.

The frequency offset and modulation index (also termed "frequency deviation") are properties of the BT packet. Therefore, any of the signals generated by the antennas of the antenna array responsive to the incident electromagnetic signal can be used to estimate the frequency offset and modulation. Accordingly, in an embodiment, switching controller 912 can control the switch to output any of the generated signals during the sync word portion of the received packet. For example, switching controller 912 can generate a control signal antNum that controls the operation the switch coupled to the antenna array. In particular, control signal antNum controls which of the signals generated by the antennas of the antenna array are output by the switch. Thus, control signal antNum effectively controls which signal is passed to the downconverter and eventually received by snapshot determining module 900 as a baseband complex IQ signal.

FIG. 10 shows a functional diagram of control signal antNum in the embodiment in which the antenna array includes seven antennas numbered antenna 0 to antenna 6. As shown in FIG. 10, switching controller 912 can select the first antenna of the array, antenna 0, for the joint estimation operation.

Figure 12:
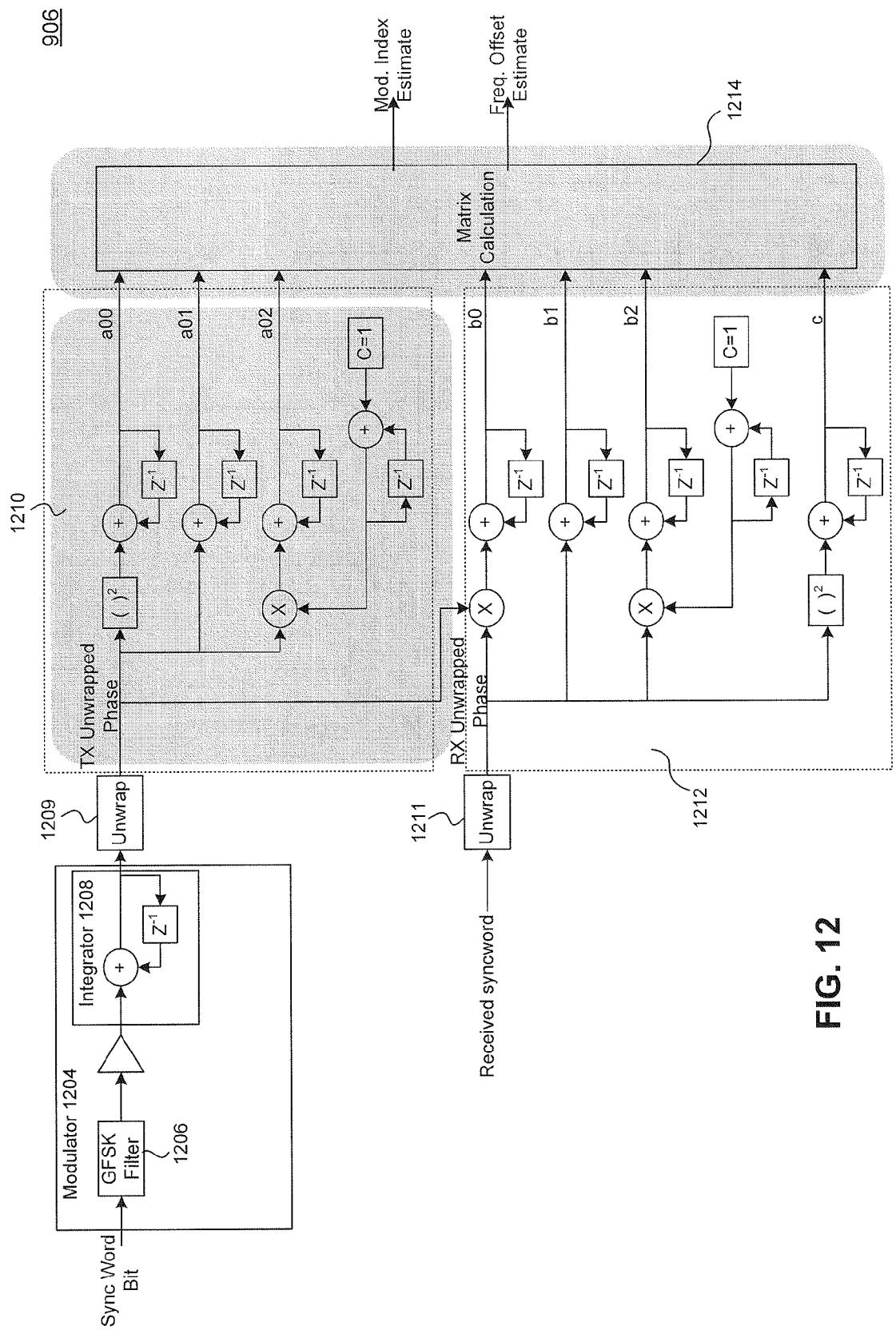
FIG. 12 shows block diagram of a joint estimator, according to an embodiment of the present invention.

FIG. 12 shows block diagram of a joint estimator 906, according to an embodiment of the present invention. Joint estimator 906 includes a modulator 1204, first and second unwrap modules 1209 and 1211, first and second least squares estimation blocks 1210 and 1212, and a matrix calculator 1214. Modulator 1204 includes a GFSK filter 1206 and an integrator 1208. In an embodiment, joint estimator 906 is similar to conventional joint estimators except that instead of using complex values to perform a least squares analysis, joint estimator performs the least squares analysis in the phase domain.

Unwrap modules 1209 and 1211 are each configured to receive a baseband complex IQ signal and to output a signal indicative of the phase of the received signal. The operation of unwrap module 1209 and 1211 are generally known to those skilled in the art. As shown in FIG. 12, unwrap module 1211 receives the baseband complex IQ signal and outputs its respective phase signal.

In an embodiment, the bit pattern of syncword 1002 is known. For example in FIG. 9, joint estimator 900 can be coupled to memory 914 that stores the bit pattern of the syncword 1002. Modulator 1204 modulates the known syncword bit pattern according to the Gaussian frequency shift keying (GFSK) modulation scheme. As shown in FIG. 12, in modulator 1204, the known syncword bit pattern is first passed through a GFSK filter 1206 and the filtered bit pattern is then integrated by integrator 1208. In alternate embodiments, modulator 1204 can include other types of filters that have relatively similar, but not identical frequency characteristics as GFSK filter 1206. Thus, modulator 1204 generates a baseband complex IQ signal according to the known syncword bits. Unwrap module 1209 receives this baseband complex IQ signal and outputs a respective phase signal.

Unwrap modules 1209 and 1211, then, generate phase signals of the received baseband complex IQ signal and the locally generated baseband complex IQ signal, respectively. In the least squares operation implemented by joint estimator 906, the phase signal of the locally generated baseband complex IQ signal is fitted to the phase signal of the received baseband complex IQ signal to estimate the modulation index and frequency offset.

Least squares estimation blocks 1210 and 1212 calculate parameters a00, a01, a02, b0, b1, and b2, which are used by matrix calculator 1214 to estimate the modulation index and frequency offset of the received electromagnetic signal. As described above, the bit pattern of syncword 1002 can be known at snapshot determining module 900. Thus, parameters a00, a01, and a02, all of which depend on the modulated known bit pattern for syncword 1002, can be calculated beforehand. In such an embodiment, one or more of modulator 1204, unwrap block 1209, and first least squares estimation block 1210 can be omitted from joint estimator 906.

Second least squares estimation block 1212 calculates parameters b0, b1, and b2. Parameter b0 is a function of the correlation between the phase signals of the received and locally generated syncword phase signals, while parameters b1 and b2 are calculated based on the phase signal of the received syncword 1002.

In an embodiment, matrix calculator 1214 calculates:

$X = A^{-1} B$, where

A is a 3×3 matrix including values generated based on parameters a00, a01, and a02, B is a 3×1 column vector including values b0, b1, and b2, and X is a 3×1 column vector.

The first two entries of column vector X are the modulation index and frequency offset, respectively. The third value of column vector X is not used by snapshot determining module 900.

In the embodiment described above, the modulation index and frequency offset are calculated in a single step, i.e., the matrix calculation described above. In another embodiment, hardware complexity can be reduced by first calculating the estimated modulation index and using the modulation index to calculate an estimate for the frequency offset. In particular, as would be appreciated by those skilled in the relevant arts based on the description herein, the matrix calculation above can instead be represented as a system of three equations having three variables. In an embodiment, the first equation can be solved to determine the modulation index and the result can be substituted into the other two equations to solve for the frequency offset.

In a further embodiment, the modulation index can be known at snapshot determining module 900. For example, the modulation index can be stored in memory 914. In such an embodiment, the modulation index can be used to solve for the estimate the frequency offset. Storing the modulation index at snapshot determining module 900 can be advantageous because the removal of the error between the actual modulation index of the electromagnetic signal and the modulation index that would have been estimated by joint estimator 906 is eliminated. Using the more accurate modulation index can lead to a better estimate for the frequency offset. More accurate values for the modulation index and frequency offset, both of which are used in the derotation, can enhance the derotation operation.

Returning to FIG. 11, in step 1104, the estimated frequency offset and modulation index are used to derotate the received signal. For example, in FIG. 9, derotator 908 receives the estimated frequency offset and modulation index from joint estimator 906 and derotates samples of header 1004 from each antenna of the array.

Figure 13:
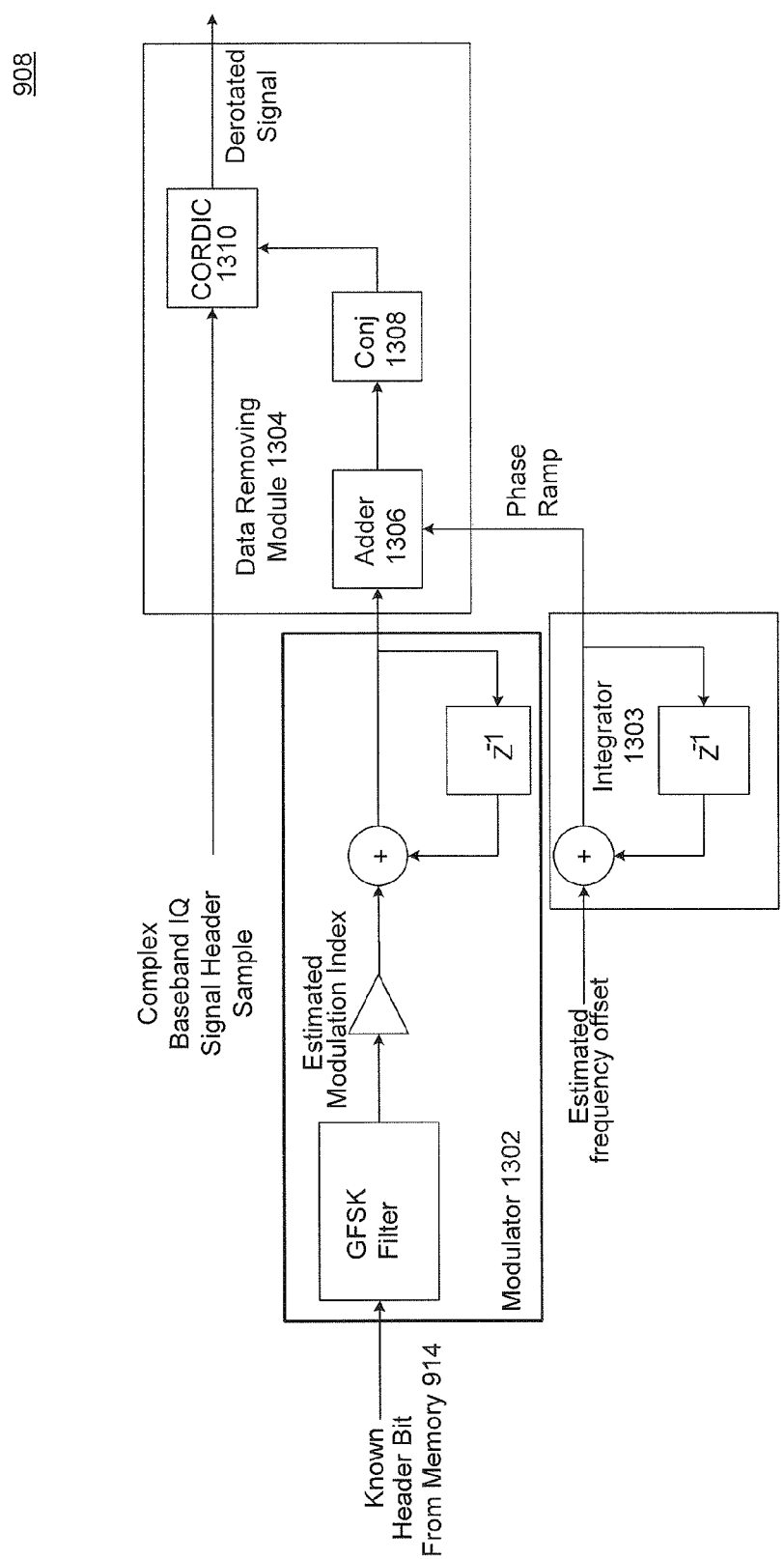
FIGS. 13-15 show a block diagrams a derotator, according to embodiments of the present invention.

FIG. 13 shows a block diagram of derotator 908, according to an embodiment of the present invention. Derotator 908 includes a modulator 1302, an integrator 1303, and a data removing module 1304. In an embodiment, modulator 1302 is substantially similar to modulator 1204 described with reference to FIG. 12. Data removing module 1304 includes an adder 1306, a conjugator 1308, and a coordinate rotation digital computer (CORDIC) 1310.

Derotator 908 is configured to derotate samples of header 1004 from each antenna of the antenna array to extract the phase of each sample that is due to the phase delay associated with each respective antenna. For example, in the embodiment in which the antenna array includes seven antennas and the length of header 1004 is 54 μs, derotator 908 can derotate a 7.7 μs sample of header 1004 from each signal to extract a phase of the electromagnetic signal incident on each antenna. In another embodiment, the antenna array includes nine antennas. In such an embodiment, if header 1004 is 54 μs, derotator 908 can derotate a 6 μs sample of each signal.

In an embodiment, the bit pattern for header 1004 is known at snapshot determining module 900. For example, the bit pattern can be stored in memory 914. As shown in FIG. 13, derotator 908 receives a sample of the received header 1004 and a corresponding header bit pattern (e.g., from memory 914). Modulator 1302 GFSK modulates the known header bit pattern to generate a signal having phase determined by the modulated bits. The phase of the signal output by modulator 1302 is due to the modulated bits. Thus, the phase of the modulated bits is $\Phi_{BP}$. Integrator 1303 integrates the estimated frequency offset to approximate the phase contribution of the frequency offset. The integrated frequency offset has a phase $\Phi_{FO}$.

Data removing module 1304 receives the phase of the modulated known header bits and the phase of the integrated frequency offset at adder 1306. Adder 1306 adds the two phases to generate a sum $\Phi_{BP}+\Phi_{FO}$. Conjugator 1308 is configured to reverse the sign of an input phase signal. Thus, in derotator 908, conjugator 1308 receives phase $\Phi_{BP}+\Phi_{FO}$ and outputs $-(\Phi_{BP}+\Phi_{FO})$. CORDIC 1310 receives a received complex IQ baseband header sample and the output of conjugator 1308, $-(\Phi_{BP}+\Phi_{FO})$. CORDIC 1310 is configured to receive a complex number and a phase and to output the received complex number rotated by the received phase. In derotator 908, CORDIC 1310 rotates the received complex IQ baseband header sample by $-(\Phi_{BP}+\Phi_{FO})$, effectively removing the phase contribution of the bit pattern and frequency offset from the phase of the received complex IQ baseband header sample. Accordingly, as described above, once the phase contribution of the modulated bit pattern and the frequency offset are removed, what remains is the phase contribution of the phase delay for the antenna of the antenna array corresponding to the received sample.

Figure 14:
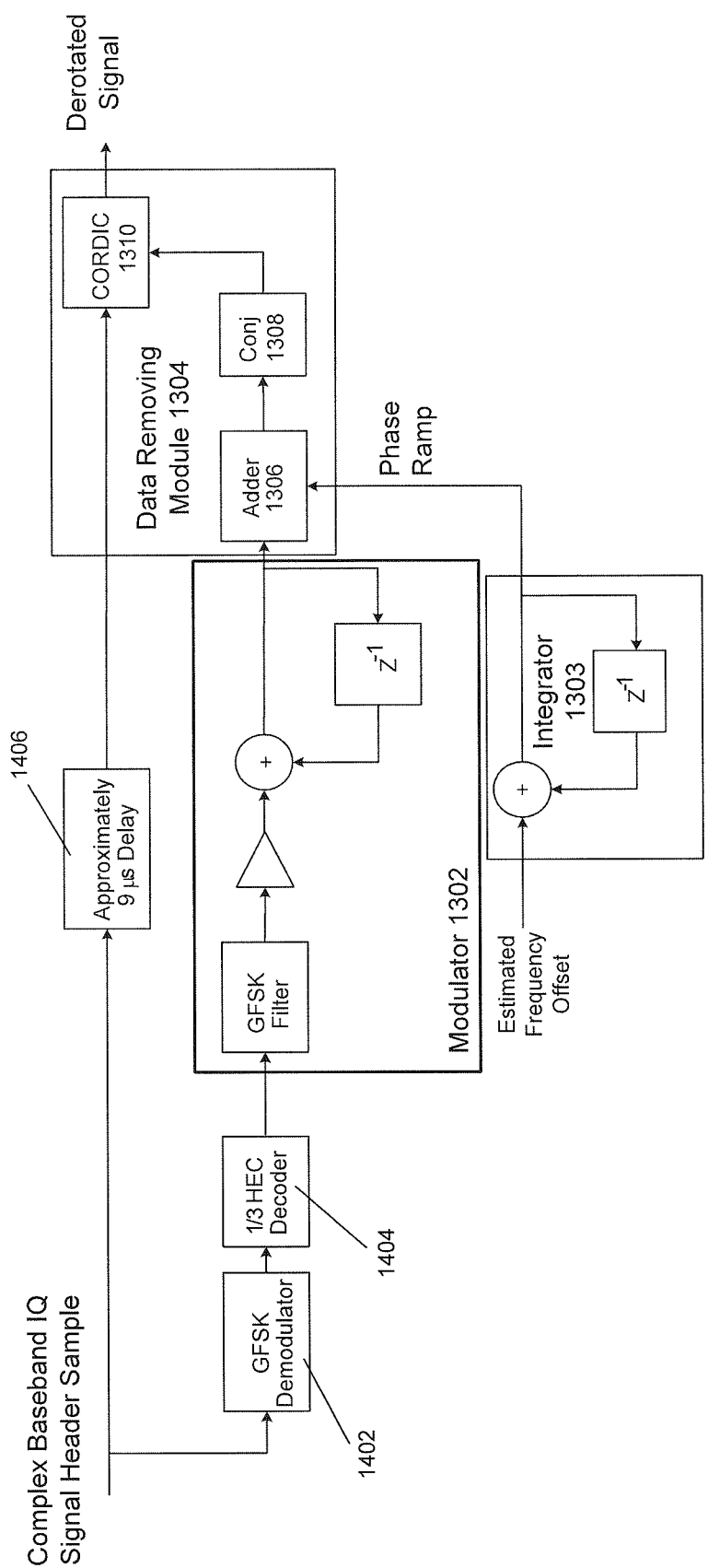

FIG. 14 shows another implementation of derotator 908, according to an embodiment of the present invention. For example, the embodiment of FIG. 14 can be used where the bit pattern of header 1004 is not known at snapshot determining module 900.

As shown in FIG. 14, derotator 908 includes a GFSK demodulator 1402, a decoder 1404, a delay module 1406, modulator 1302, and data removing module 1304. In the embodiment of FIG. 14, GFSK demodulator 1402 and decoder 1404 are used to determine the bit pattern of header 1004. Specifically, GFSK demodulator 1402 the received header 1004 and decoder 1404 decodes the demodulated signal to provide the bit pattern. In an embodiment, decoder 1404 can be a ⅓ HEC decoder. Thereafter, this determined bit pattern is used in an identical manner as the known bit pattern in embodiment of FIG. 13 to derotate a sample of header 1004 for each of the signals generated by the antenna array.

The demodulation and decoding operations completed by GFSK demodulator 1402 and decoder 1404 can cause a delay. To account for this delay, delay block 1406 is introduced. In an embodiment, delay block 1406 introduces a delay of approximately 9 μs in the derotation operation to account for the demodulation and decoding.

Returning to FIG. 11, in step 1106, the derotated signals are integrated to determine the values of the snapshot vector. For example, in FIG. 9, averaging module 918 can receive each of the derotated signals and average the signals over the sample period, e.g., over a 6 μs sample period. The values generated as a result of the averaging form the snapshot vector.

Switching between different signals can generate transients in the first 2 μs and last 1 μs of the sample. Thus, in an embodiment, integrator 910 can average each of the derotated signals over a portion of the sample that is not subject to transients. For example, in the embodiment in which the sample period is 6 μs, integrator 910 can integrate over the 3 μs period that is not subject to transients.

In a further embodiment, each of the values generated by averaging module 910 can also include an amplitude corresponding to an amplitude of the received electromagnetic signal on an antenna of the array. As would be appreciated by those skilled in the relevant arts based on the description herein, as the amplitude of the received electromagnetic signal rises, the likelihood that the received signal will have errors decreases. Thus, in an embodiment, payload 1006 can be processed using the signal that has the highest amplitude. For example, as shown in FIG. 10, during payload 1006, control signal antNum is set to "P," which is the antenna of the array whose signal has the highest amplitude.

Figure 15:
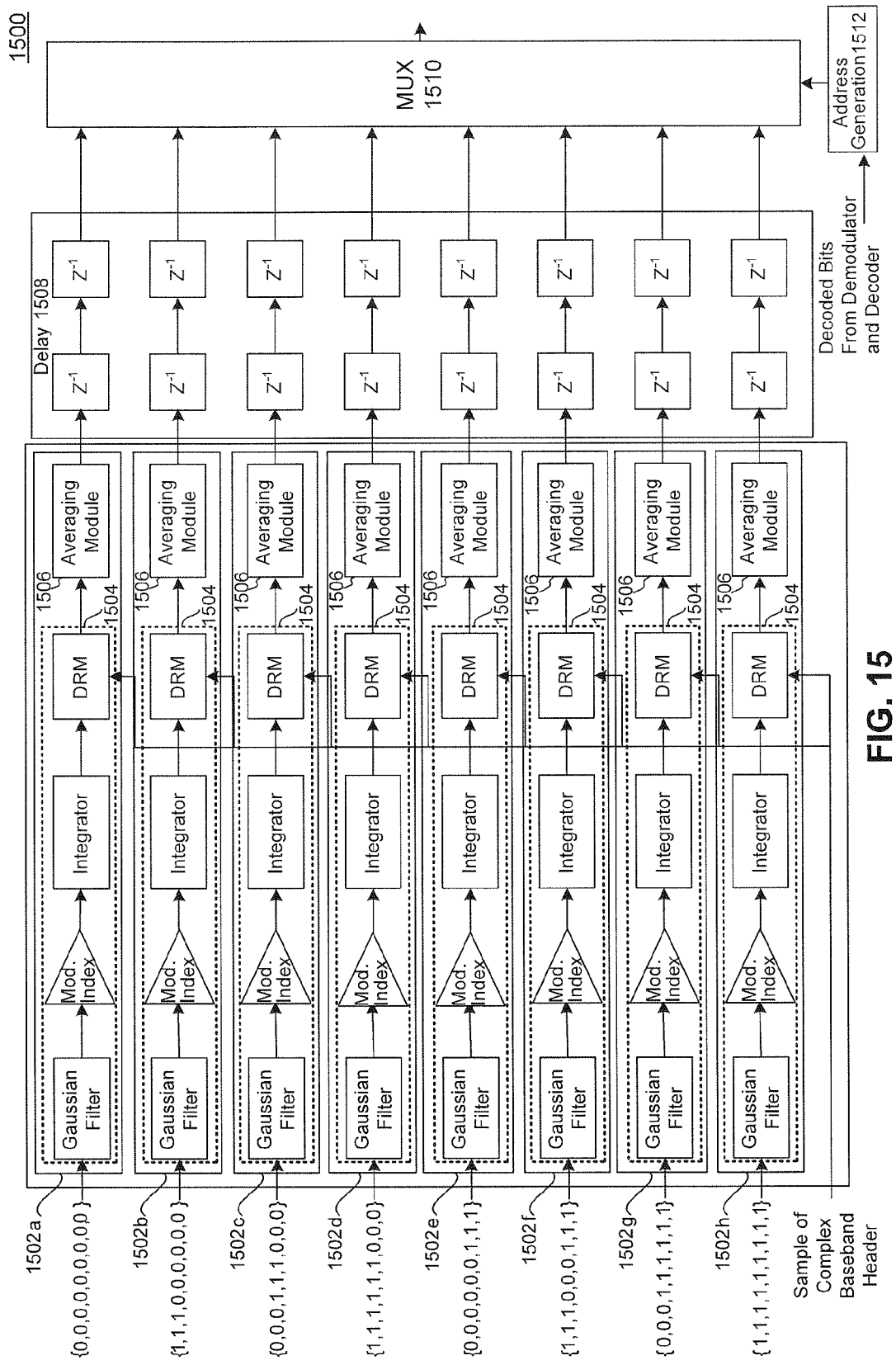

FIG. 15 shows a diagram of another implementation of derotator 908 and averaging module 910, according to an embodiment of the present invention. The embodiment of FIG. 15 can also be used in the case where the received header bit pattern is not known at the receiver. Unlike the embodiment of FIG. 14, where the received signal is first demodulated and decoded and then the decoded signal is used to derotate the received signal, in the embodiment of FIG. 15, the demodulation and decoding and the derotation operations occur in parallel. Doing so can reduce the delay caused by the demodulation and decoding.

As shown in FIG. 15, demodulation and averaging module 1500 includes branches 1502a-1502h (collectively "1502"). Each of branches 1502 includes a derotator 1504 and an averaging module 1506. Each of derotators 1504 can be substantially similar to derotator 908 shown in FIG. 13. Each of averaging modules 1506 can be substantially similar to averaging module 910, shown in FIG. 9. For the purposes of simplicity, integrator 1303 has been omitted from derotators 1504 shown in FIG. 15.

In an embodiment, a header bit pattern can be made up of three bits and each of the bits is repeated three times according to the encoding scheme. Thus, there are eight possibilities for the header bit pattern because there are essentially three data bits in the header ($2^3$=8), e.g., ranging from 000 000 000 to 111 111 111 (the different possibilities are shown in FIG. 15).

As shown in FIG. 15, each of branches 1502 receives a respective bit pattern. Branches 1502 then derotate the received header sample using the respective bit pattern and average the resulting derotated signal to generate a value for the snapshot vector. After passing through a delay block 1508, which is configured to account for any delay due to demodulation and decoding operations on the received header sample, each of the values are input into a multiplexer 1510.

In parallel with the derotation and averaging operations done by branches 1502, the received header sample is demodulated and decoded to reveal its bit pattern, e.g., using demodulator 1402 and decoder 1404 (not shown in FIG. 15). The resulting bit pattern is received by an address generation module 1512. Address generation module 1512 is configured to process the received bit pattern and to generate a control signal that controls the output of multiplexer 1510. Specifically, the bit pattern of the sample of header 1004 will be one of the eight different possible bit patterns input to branches 1502. Address generation module 1512 matches the received bit pattern to one of the eight different possibilities and generates the control signal that selects the output of the corresponding branch of branches 1502 for the output of multiplexer 1510.

FIG. 15 shows the embodiment in which there are eight possible header bit patter for a given sample period. As would be appreciated by those skilled in the relevant arts based on the description herein, additional branches 1502 can included if the header samples have more than eight possible bit patterns or one or more of branches 1502 can be omitted if the header samples have fewer than eight possible bit patterns.

Figure 16:
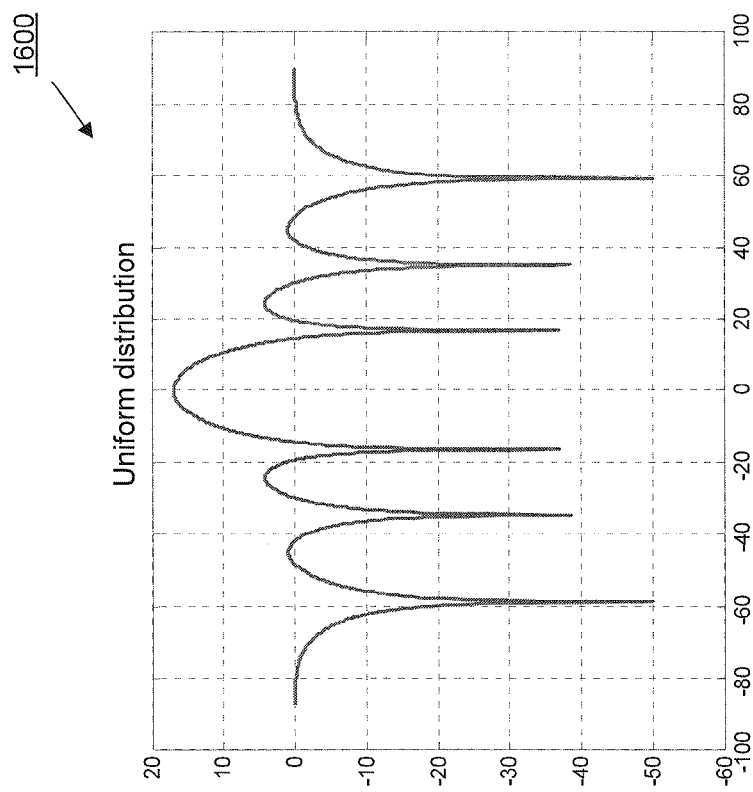
FIG. 16 shows a plot of an angular power distribution received by a uniformly spaced linear array, according to an embodiment of the present invention.

As shown in FIG. 9, snapshot determining module 900 also includes an antenna weighting module 902. As described above, different antenna configurations can be optimal for different angles of arrival. In an embodiment, antenna weighting module 902 changes the weights assigned to different antennas to mimic different antenna array configurations. For example, FIG. 16 shows a plot 1600 of an angular power distribution received by a uniformly spaced linear array when the electromagnetic signal is substantially normal to antenna array, i.e., the angle of arrival is 0 degrees. As shown in FIG. 16, there is a 13.2 dB difference between the peak power and the power of the first sidelobe. As the difference between the peak power and first side lobe gets smaller, it becomes increasingly difficult to differentiate between the two, and therefore increasingly likely that the estimated AoA will not match the actual angular position of BT transmitting device 102 relative to array 104.

Figure 17:
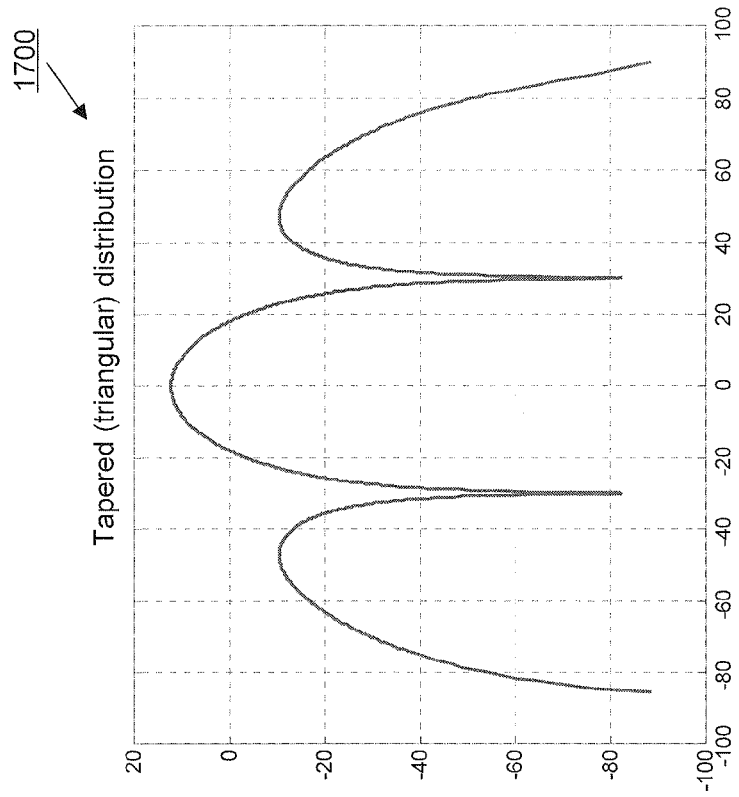
FIG. 17 shows a plot of angular power distribution when the amplitudes of an antennas of array have been set to simulate a triangular distribution of antennas, according to an embodiment of the present invention.

In an embodiment, antenna weighting module 902 can set weights assigned to different antennas so as to simulate a triangular distribution of antennas. FIG. 17 shows a plot of angular power distribution of a normally received electromagnetic signal when the amplitudes of the antennas of array have been set to simulate a triangular distribution of antennas (e.g., the antennas toward the center of the array have higher amplitudes than those towards the edge of the array). As shown in FIG. 17, the difference between the peak power and first side lobe has increased from 13.2 dB from the uniform distribution shown in FIG. 16, to 22.5 dB shown in FIG. 17.

In a further embodiment, the amplitudes assigned to each antenna of the antenna array can be tapered dynamically by antenna weighting module to adapt to changes in the angle of arrival. For example, knowing that the last angle of arrival was estimated to a given angle, the amplitudes assigned to each antenna can be adjusted.

Figure 18:
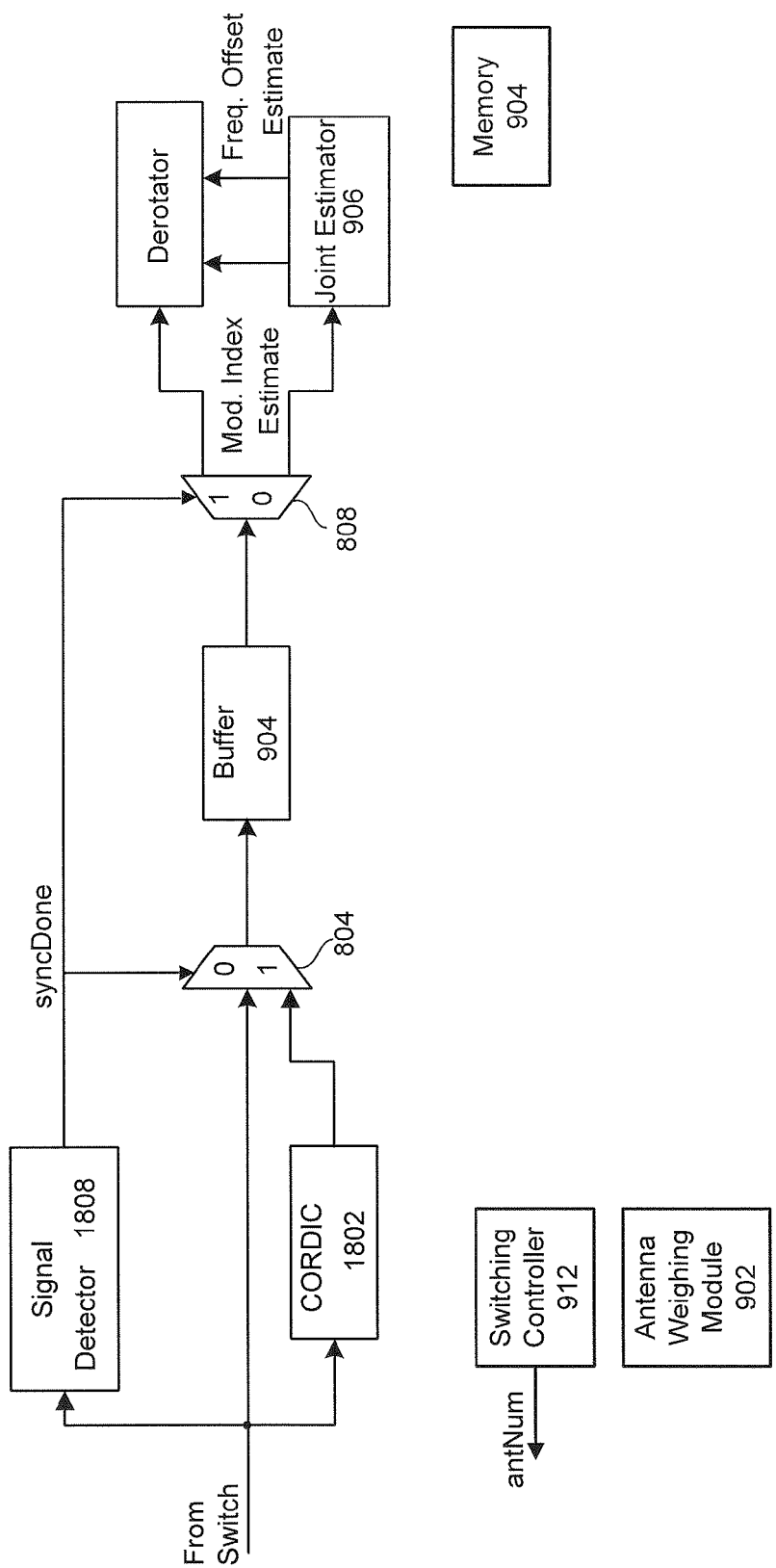
FIG. 18 shows another implementation of a snapshot determining module, according to an embodiment of the present invention.

FIG. 18 shows another implementation of snapshot determining module 900, according to an embodiment of the present invention. As shown in FIG. 18, snapshot determining module 900 includes antenna weighting module 902, buffer 904, joint estimator 906, derotator 908, integrator 910, switching controller 912, memory 914, a CORDIC block 1802, first and second multiplexers 1804 and 1806, and a signal detector 1808.

Signal detector 1808 detects different portions of BT packet 1000 and generates a control signal syncDone. Control signal syncDone controls the operation of first and second multiplexers 1804 and 1806. As shown in FIG. 10, control signal syncDone is at a logic low during syncword 1002 and a logic high otherwise. Thus, during syncword 1002, control signal syncDone controls first multiplexer 1804 to pass the output of CORDIC block 1802 to buffer 904 and controls second multiplexer 904 to pass the output of buffer 904 to joint estimator. Accordingly, during syncword 1002, joint estimator 906 receives a phase signal of syncword 1002 (subject to the delay imposed by buffer 904, as described above). Therefore, in the embodiment of FIG. 18, syncword 1002 may not be input to CORDIC block 1202, as the phase signal of syncword 1002 may already be generated before the information is input into buffer 904.

When signal detector 1808 detects that header 1004 of BT packet 1000 has started, signal detector 1808 toggles control signal syncDone to a logic high. Thereafter, the complex IQ baseband of header 1004 is input into buffer 904 by second multiplexer 1806 (without being processed by CORDIC 1802). The output of buffer 904 is then received by derotator 908. Thus, during header 1004, signal detector 1808 controls first and second multiplexers 1804 and 1806 to enable the derotation operation.

Payload 1006 follows header 1004. Payload 1006 can contain information that other portions of the console process. For example, in the embodiment of a gaming environment, payload 1006 can include gaming information such as a button pushed by a user who is using the handheld transmitter. As shown in FIG. 10, payload 1006 is processed by an antenna P, i.e., the antenna of antennas 0-antenna 6 which has the strongest signal. In an embodiment, the snapshot determining module can determine based on the snapshot vector which of the antennas best received the electromagnetic signal (e.g., the amplitude of the received was the highest). In such an embodiment, switching controller 912 can control the antenna switch so that the signal used to process payload 1006 is generated by the antenna that best received the electromagnetic signal.

The operation of snapshot determining module 900 has been described with reference to the embodiment in which it is coupled to a single antenna array. As described above, in other embodiments, snapshot determining module 900 can be coupled to multiple array arrays. In such an embodiment, snapshot determining module 900 can repeat its operation for each array to generate respective snapshot vectors (e.g., the embodiment of FIG. 4) or can combine the different values for the different antennas into a single snapshot vector (e.g., the embodiment of FIG. 5).

IV. AOA PROCESSING SYSTEM

Figure 19:
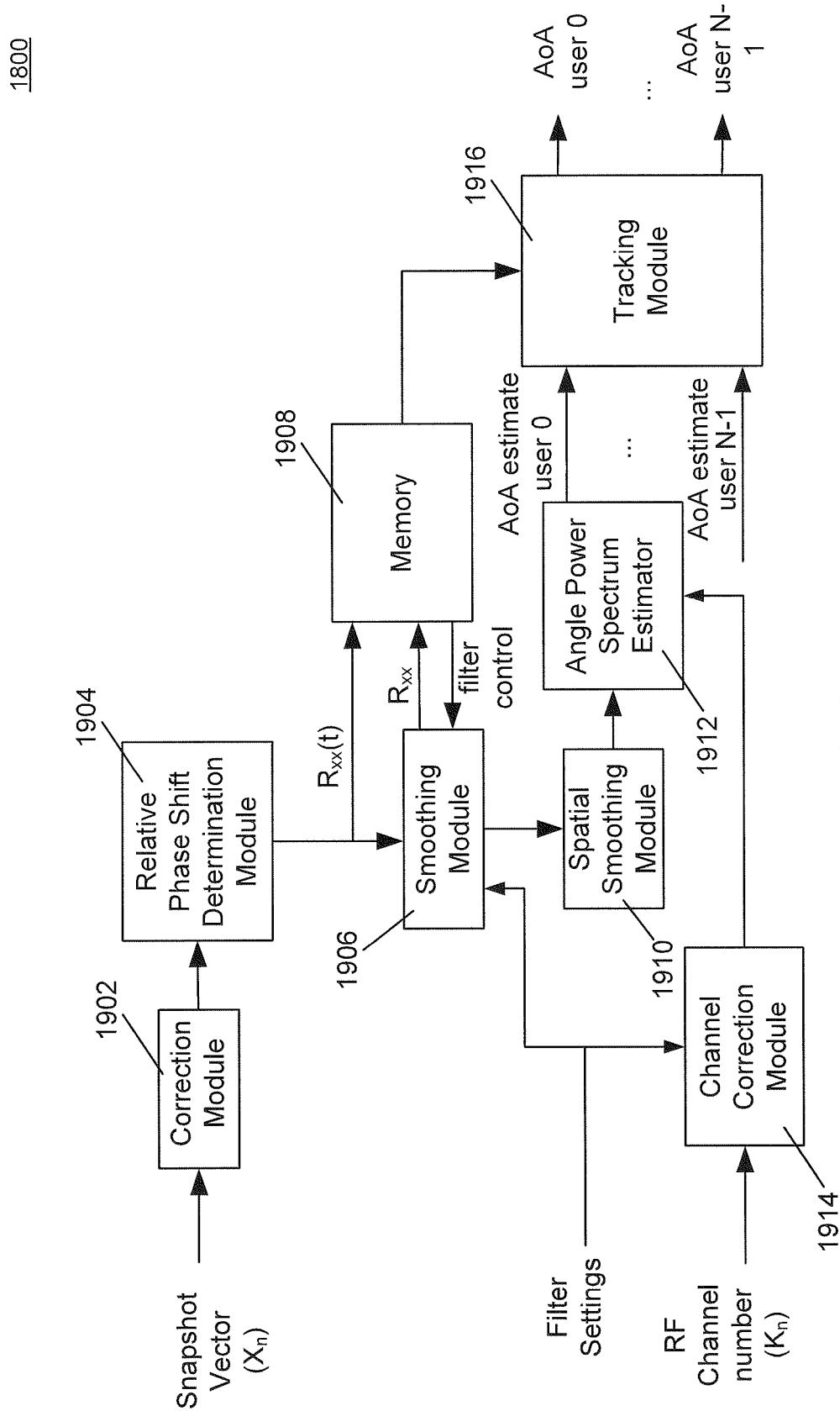
FIG. 19 shows a block diagram of an angle of an AoA processing module, according to an embodiment of the present invention.

FIG. 19 shows a block diagram of an angle of an AoA processing module 1900, according to an embodiment of the present invention. In an embodiment, at least one of AoA processing module 112 and AoA processing module 422 can be implemented as AoA processing module 1900. AoA processing module includes a correction module 1902, a relative phase shift determination module 1904, a smoothing module 1906, a memory storing statistical error measurements 1908, a spatial smoothing module 1910, an angle power spectrum estimator 1912, channel correction module 1914, and a tracking module 1916. In an embodiment, the elements of AoA processing module 1900 can be implemented as software modules running on a processing device, e.g., a digital signal processor (DSP).

As shown in FIG. 19, AoA processing system 1900 receives a snapshot vector. For example, AoA processing system 1900 can receive the snapshot vector from a snapshot determining module, e.g., snapshot determining module 900 shown in FIG. 9.

The snapshot vector is termed "$X_n$", where n is the number of values in the vector, which is equal to the number of antennas in the antenna array, as described above. Correction module 1902 receives snapshot vector $X_n$. Correction module 1902 is configured to correct for deterministic degradation of snapshot vector $X_n$. For example, correction module 1902 can correct for non-ideal spacing between antennas in the antenna array. For example, the antenna array may be designed as a uniformly spaced linear array, but because of tolerances in the manufacturing of the antenna array, the spacing between antennas may not be precisely uniform. Correction module 1902 can be configured to correct for these types of deterministic degradations.

In an embodiment, correction module 1902 can multiply snapshot vector $X_n$ with a matrix that is configured to correct for these non-uniformities. After being multiplied with the correction matrix, the resulting corrected snapshot vector is the snapshot vector that would have been generated had the spacing between the antennas of array 104 been precisely uniform.

Correction module 1902 can be an optional component. Thus, in an embodiment, correction module 1902 is omitted from AoA processing module 1902.

Relative phase shift determination module 1904 receives the correction snapshot vector $X_n$ from correction module 1902. Relative phase shift determination module 1904 is configured to determine a phase shift between every combination of signals generated by the antenna array. In doing so, relative phase shift determination module 1904 effectively determines the difference between the phase of the electromagnetic signal incident on each antenna of the antenna array and the phase of the electromagnetic signal incident on every other antenna of the antenna array.

Figure 20:
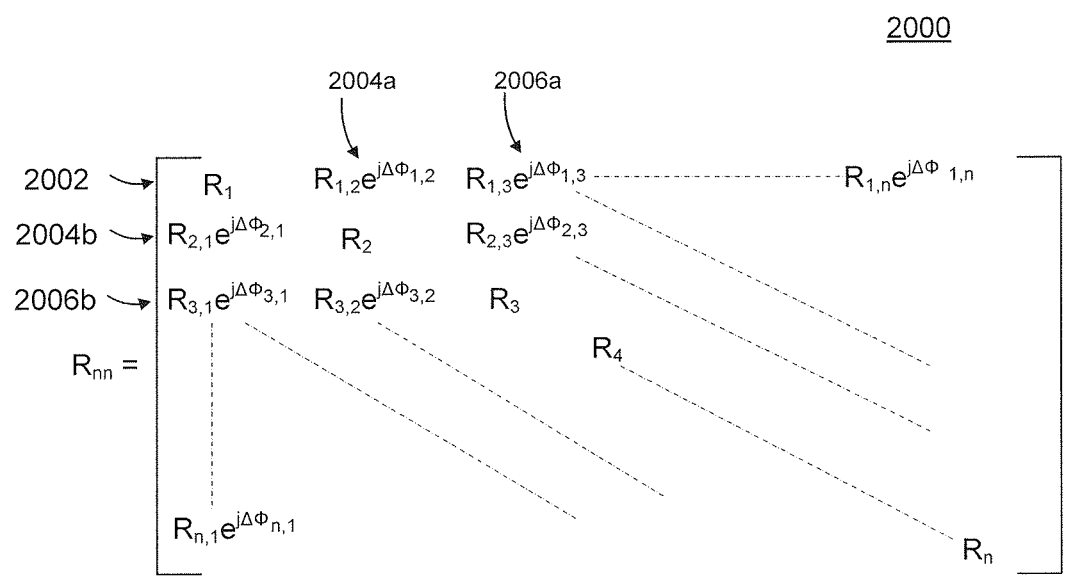
FIG. 20 shows a diagram of a covariance matrix, according to an embodiment of the present invention.

In an embodiment, relative phase shift determination module 1904 is configured to multiply snapshot vector $X_n$ with the transpose of the snapshot vector, $X^T_n$. In doing so, relative phase shift determining module 1904 generates a covariance matrix, $R_{nn}$. FIG. 20 shows a diagram of covariance matrix $R_{nn}$, according to an embodiment of the present invention. As shown in FIG. 20, covariance matrix $R_{nn}$ includes a set of real numbers on first diagonal 2002. Each of the values in first diagonal 2002 is the square of a respective value of snapshot vector $X_n$. For example, value $R_1$ is the square of the first value of snapshot vector $X_n$. Each of the values in second diagonals 2004a and 2004b includes the product of the amplitudes of adjacent values in snapshot vector $X_n$ and the phase difference between adjacent values in snapshot vector $X_n$. For example, value $R_{1,2}e^{\Delta\Phi_{1,2}}$ includes $R_{1,2}$ (the product of the amplitudes of the first and second values in snapshot vector $X_n$) and $e^{\Delta\Phi_{1,2}}$ (representative of the phase difference between the first and second values in snapshot vector $X_n$). Therefore, value $R_{1,2}e^{\Delta\Phi_{1,2}}$ is also indicative of the phase difference between the signals generated by the first and second antennas of the antenna array, and thus indicative of the difference in phase between the electromagnetic signal as it was incident on the first antenna and as it was incident on the second antenna of the antenna array.

Second diagonals 2006a and 2006b include values indicative of the phase difference between every second value of snapshot vector $X_n$. For example, value $R_{1,3}e^{\Delta\Phi_{1,3}}$ includes $R_{1,3}$ (the product of the amplitudes of the first and third values in snapshot vector $X_n$) and $E^{\Delta\Phi_{1,3}}$ (representative of the phase difference between the first and third values in snapshot vector $X_n$). The remaining diagonals of covariance matrix $R_{nn}$ include values that include the product of the amplitudes and of phase differences of antennas having increasing distance between them, e.g., the third diagonals including values that are indicative of the product of the amplitudes of and the phase shift between every third value of snapshot vector, the fourth diagonals including values that are indicative of the product of the amplitudes of and the phase shift between every fourth value of snapshot vector, and so on. The $n^{th}$ diagonals each include a single value indicating the product of the amplitudes of and the phase difference between the first and last values of the snapshot vector.

Smoothing module 1906 receives the relative phase shifts and power determined by relative phase shift determining module 1904 and filters noise out of the received information. For example, smoothing module 1906 can filter noise out of covariance matrix $R_{nn}$. In an embodiment, smoothing module 1906 filters covariance matrix $R_{nn}$ using a Kalman filter based on a variety of parameters stored in memory 1908. For example, the parameters can include as the noise and interference power, the user's expected motion, and other error measurements that are dynamically measured. When using the user's expected motion, the Kalman filter can be tuned to balance the tradeoff between being able to resolve a fast moving user using a transmitting device, i.e., a device having high angular velocity, and long-term accuracy when the user stops moving. The user's expected motion can be calculated using past estimated angles of arrival. Specifically, the past estimated angles of arrival can be used to calculate an angular velocity. In an embodiment, the calculated angular velocity can be indicative of the user's expected motion. As conditions change, e.g., the noise or interference power changes, the user's angular velocity changes, etc., the Kalman filter can be dynamically updated accordingly.

Spatial smoothing module 1910 is configured to reduce a coherence between different reflections of the electromagnetic signal. In a multipath environment, the antenna array can receive the electromagnetic signal from the handheld transmitter and from one or more locations from which the electromagnetic signal has been reflected. To reduce the effects of the reflections, spatial smoothing module 1910 is configured to reduce the coherence between different reflections in a multipath environment.

In an embodiment, spatial smoothing module 1910 is configured pull sub-matrices out of smoothed covariance matrix $R_{nn}$ and average them. For example, FIG. 21 shows a diagram of covariance matrix $R_{nn}$ including sub-matrices 2102-2106, according to an embodiment of the present invention. As shown in FIG. 21, each of sub-matrices 2102-2106 is a 2×2 matrix that shares a center diagonal with the center diagonal of covariance matrix $R_{nn}$. To reduce the coherence between reflections in a multipath environment, sub-matrices 2102-2106 can be averaged and the result can be used for the remaining operations of AoA processing module 1900. In FIG. 21, three sub-matrices are shown; however, as would be appreciated by those having skill in the art based on the description herein, covariance $R_{nn}$ may have a different number of 2×2 sub-matrices depending on the dimensions of covariance matrix $R_{nn}$. For example, in the embodiment that covariance matrix $R_{nn}$ is 5×5, it would include four 2×2 sub-matrices that share a common center diagonal with covariance matrix $R_{nn}$. The result of the spatial smoothing operation is a spatially smoothed covariance matrix $S_{mm}$ that is an average of the sub-matrices pulled from covariance matrix $R_{nn}$ having the same dimensions as the sub-matrices (i.e., m×m). Thus, as a result of the spatial smoothing operation, the number of antennas in the array effectively is decreased from n to m. In other words, spatially smoothed covariance matrix $S_{mm}$ is effectively a covariance matrix for an antenna array that includes m antennas.

In choosing the dimensions of the sub-matrices to be pulled out of covariance matrix $R_{nn}$, a tradeoff occurs between the reduction in coherence and the resolution in the angle of arrival estimation. In particular, if sub-matrices of a larger dimension are used, the resolution of the angle of arrival estimation increases, but the reduction of the coherence between the different reflections decreases. In an embodiment, for a covariance matrix $R_{nn}$ that is 9×9 (i.e., in the case that the antenna array includes nine antennas), the sub-matrices can be 5×5 matrices or 6×6 matrices. In another embodiment, the dimensions of the sub-matrices can be changed according environmental conditions. For example, in environments where there are relatively few reflections of the electromagnetic signal, the size of the sub-matrices can be increased.

Spatially smoothed covariance matrix $S_{mm}$ is received by angle power estimator 1912. Angle power estimator 1912 is configured to generate an angle power spectrum for the received electromagnetic signal. For example, angle power estimator 1912 can be configured to generate an angle power spectrum similar to either of angle power spectrums 1600 or 1700 shown in FIGS. 16 and 17, respectively. The operation of angle power estimator 1912 will be described with respect to FIG. 22.

Figure 22:
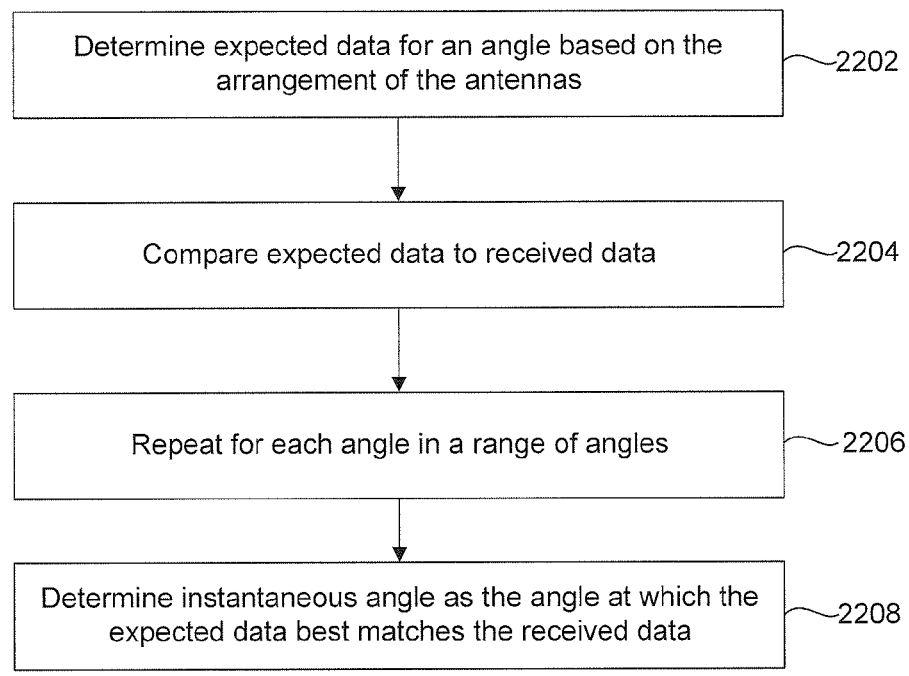
FIG. 22 is a flowchart of an exemplary method of generating an angle power spectrum, according to an embodiment of the present invention.

FIG. 22 is a flowchart of an exemplary method 2200 of generating an angle power spectrum, according to an embodiment of the present invention. Other structural and operational embodiments will be apparent to persons skilled in the relevant art(s) based on the following discussion. Flowchart 2200 is described with reference to the embodiment of FIG. 19. However, flowchart 2200 is not limited to that embodiment. The steps shown in FIG. 22 do not necessarily have to occur in the order shown. The steps of FIG. 22 are described in detail below.

In step 2202, expected data for an angle of arrival is determined. For example, in FIG. 19, angle power estimator 1912 generates a vector $v_\theta$ that includes expected values for an angle of arrival $\theta$. For example, in the embodiment that spatially smoothed covariance matrix $S_{mm}$ is a 4×4 matrix, angle power estimator 1912 generates vector $v_\theta$ including four values. Each value is indicative of an expected phase of an incident electromagnetic signal if the signal had an angle of arrival of $\theta$. In embodiment in which the antenna array is uniformly spaced linear array, $v_\theta$ can be given the equation $$v_\theta = \begin{bmatrix} e^{\frac{-j3\pi d \sin\theta}{2\lambda}} \\ e^{\frac{-j\pi d \sin\theta}{2\lambda}} \\ e^{\frac{j\pi d \sin\theta}{2\lambda}} \\ e^{\frac{j3\pi d \sin\theta}{2\lambda}} \end{bmatrix},$$

where d is the spacing between the antennas in the antenna array, and $\lambda$ is the wavelength of the electromagnetic signal. More generally, each value of vector $v_\theta$ can be determined based on the shape of the antenna array and the number of antennas in the antenna array, as would be appreciated by those skilled in the art based on the description herein.

In step 2204, the expected data is compared to the received data. For example, in FIG. 19, after computing vector $v_\theta$, angle power estimator 1912 compares it to observed data included in spatially smoothed covariance matrix $S_{mm}$. For example, angle power estimator 1912 can compute $$P(\theta) = \frac{v'_\theta S_{mm} v_\theta}{N_{rx}},$$

where $v'_\theta$ is the transpose of vector $v_\theta$ and $N_{rx}$ is a normalizing constant. $N_{rx}$ can be computed such that high value of $P(\theta)$ for all $\theta$ is 1.

In step 2206, the steps 2202 and 2204 are repeated for every angle in a range of angles down to the required resolution. For example, in FIG. 19, angle power estimator 1912 can repeat steps 2202 and 2204 for angles between −90 and +90 degrees. In doing so, angle power estimator calculates an angle power spectrum for the received electromagnetic signal.

In step 2208, an instantaneous angle of arrival is determined as the best match between the expected data and the observed data. For example, in FIG. 19, angle of arrival estimator 1912 can determine the instantaneous angle of arrival to be the angle at which function $P(\theta)$ is the largest.

In another embodiment, angle power estimator 1912 can use a Fast Fourier Transform (FFT) to complete steps 2202-2206 in a single operation if the antenna array is a uniformly spaced linear array. In other words, an FFT can effectively be used to compute the angle power spectrum in a single step. Because the FFT operation is generally a computationally efficient operation, using the FFT to compute the angle power spectrum can enhance the efficiency angle power spectrum estimator 1912.

Channel correction module 1914 is configured to average for channel variation in the angle power spectrum calculation done by angle power estimator 1912. As would be appreciated by those skilled in the art based on the description herein, wireless systems often are implemented as a frequency hopping systems in which the frequency at which an electromagnetic signal is transmitted changes over time. Channel correction module 1914 averages contributions from different frequencies so that angle power estimator can compute an accurate angular power distribution.

Thus, angle power estimator 1912 is configured to receive spatially smoothed covariance matrix $S_{mm}$ and to output an instantaneous angle of arrival. Tracking module 1916 is configured to estimate an angle of arrival based the instantaneous angle of arrival and at least one past estimated angle of arrival. The operation of tracking module 1918 will be described with reference to FIG. 23. In an embodiment, the object of tracking module 1916 is to interpret the instantaneous angle of arrival in light of past data and accordingly estimate an angle of arrival that is a result of the position of the handheld transmitter and not the result of noise, occlusions, etc.

Figure 23:
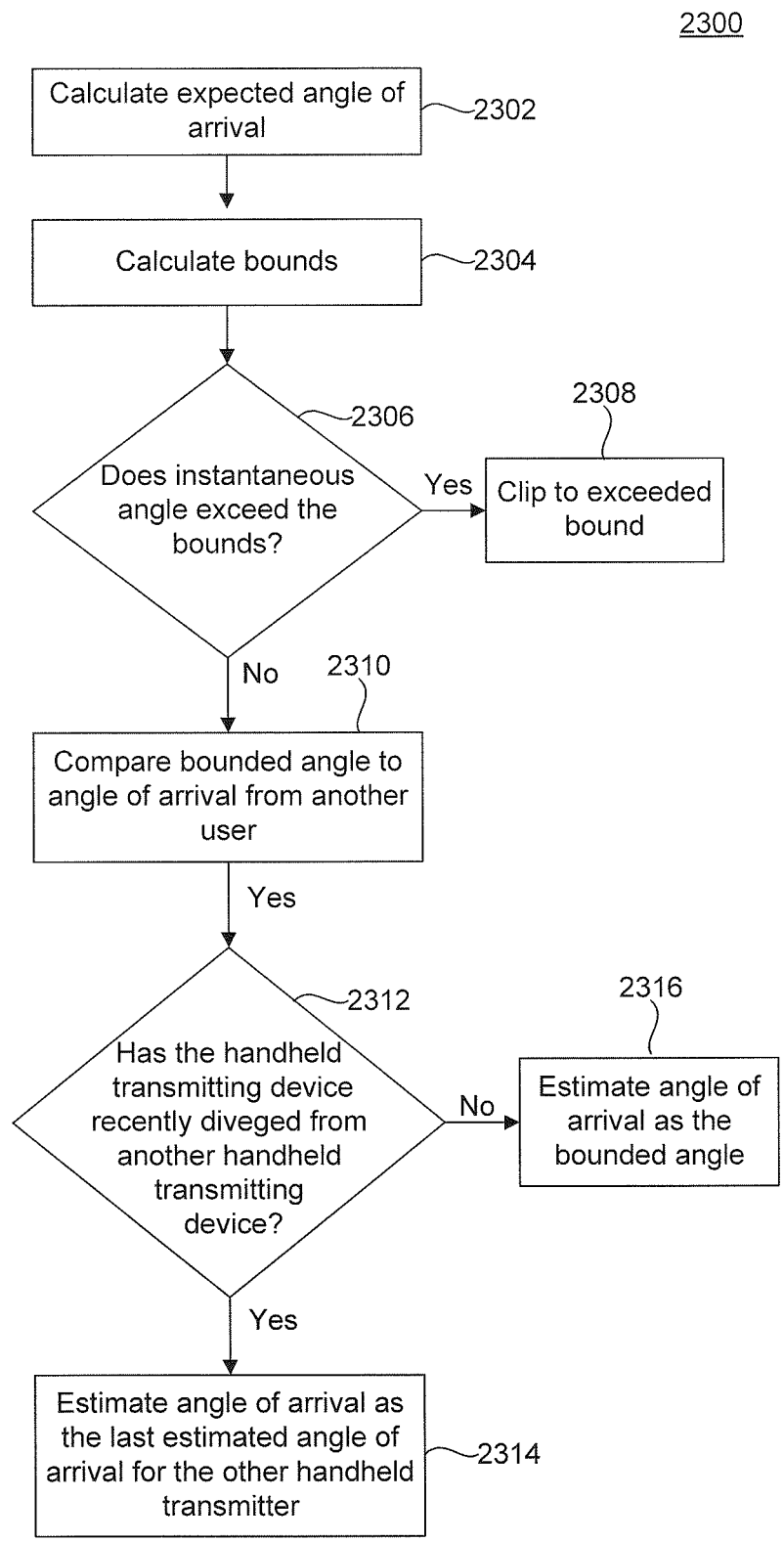
FIG. 23 is a flowchart of an exemplary method of estimating an angle of arrival, according to an embodiment of the present invention.

FIG. 23 is a flowchart of an exemplary method 2300 of generating an angle power spectrum, according to an embodiment of the present invention. Other structural and operational embodiments will be apparent to persons skilled in the relevant art(s) based on the following discussion. Flowchart 2300 is described with reference to the embodiment of FIG. 19. However, flowchart 2300 is not limited to that embodiment. The steps shown in FIG. 23 do not necessarily have to occur in the order shown. The steps of FIG. 23 are described in detail below.

In step 2302, an expected angle of arrival is calculated. For example, in FIG. 19, tracking module 1916 can calculate an expected angle of arrival based on past estimated angle of arrivals. For example, in estimating an angle of arrival for time instant k, tracking module 1916 can access memory 1908 for N past estimated of arrivals, $\theta_{k-N-1:k-1}$. The estimated angle of arrival for time instant k, $\hat{\theta}_k$, can be calculated as $\hat{\theta}_k = a(N+1)^2 + b(N+1) + c$, where:

a=$\ddot{\theta}_{k-N-1:k-1}$ (the second derivative, or acceleration, of the estimated angle of arrival between time instants k−N−1 and k−1), b=$\dot{\theta}_{k-N-1:k-1}$ (the first derivative, or velocity, of the estimated angle of arrival between time instants k−N−1 and k−1), and c=$E[\theta_{k-N-1:k-1}]$ (the average angle of arrival between time instants k−N−1 and k−1).

In step 2304, angle bounds are calculated. For example, in FIG. 19, tracking module 1916 calculates bounds for the instantaneous angle of arrival. In an embodiment, tracking module 1916 can calculate bounds $\theta_k^{max}$ and $\theta_k^{min}$ as:

$\theta_k^{max} = \hat{\theta}_k + \psi$, and $\theta_k^{max} = \hat{\theta}_k - \psi$.

The factor $\psi$ is a tunable projection bound. As factor $\psi$ is increased, the bounds are better able to capture dynamic movements of the user. As factor $\psi$ is decreased, the bounds are better at discarding instantaneous angles of arrival that are a product of noise, occlusions, etc. In an embodiment, factor $\psi$ can be set to 2 or 4 degrees.

In step 2306, it is determined whether the instantaneous angle of arrival exceeds the calculated bounds. For example, in FIG. 19, tracking module 1918 determines whether the instantaneous angle of arrival received from angle power estimator 1912 exceeds either of $\theta_k^{max}$ and $\theta_k^{min}$.

If the instantaneous angle of arrival exceeds the angle bounds, method 2300 proceeds to step 2308. In step 2308, the instantaneous angle is clipped to the exceeded bound. For example, in FIG. 19, tracking module 1918 can set the instantaneous angle of arrival to whichever of $\theta_k^{max}$ and $\theta_k^{min}$ was exceeded.

In an embodiment, determining the physics-bounded angle of arrival, $\theta_k^{pb}$ as described in steps 2306 and 2308 can be summarized as follows:

$$\theta_k^{pb} = \begin{cases} \theta_k^{min}, & \theta_k < \theta_k^{min} \\ \theta_k^{max}, & \theta_k > \theta_k^{max} \\ \theta_k, & \text{else.} \end{cases}$$

The use of bounds using the laws of physics can be especially important when temporary occlusions or barriers obstruct the line of sight path between handheld transmitter and the antenna array. In that case, the strongest power may be received from reflections from the surrounding area, leading to a physically impossible instantaneous angle of arrival. Through the use of physics tracking, the a physics-bounded angle of arrival can be determined that avoids such physically impossible movements.

As described above, wireless systems can include more than one handheld transmitters. In one embodiment, more than one handheld transmitters can be used when there are multiple users using the system (e.g., one handheld transmitter per user). In such an embodiment, the angle of arrival estimation system can be used to estimate angles of arrival for each handheld transmitter. In a further embodiment, past angles of arrivals for different handheld transmitters can be used to refine the angle of arrival estimate.

For example, in step 2312, it is determined whether the handheld transmitter has suddenly diverged from another transmitter. For example, in FIG. 19, tracking module 1916 compares a set of estimated angle of arrivals for the handheld transmitter to a corresponding set of estimated angle of arrivals for the other transmitter. If the two sets indicate that the two transmitters are converging, tracking module 1916 can then determine whether the physics-bounded angle of arrival indicates a sudden divergence. If so, tracking module 1918 can determine that a user using the handheld transmitter is behind the other handheld transmitter. Accordingly, in step 2314, the estimated angle of arrival is determined to be the last estimated angle of arrival for the other transmitter.

If it is determined that the two handheld transmitters were not converging or that they were converging and the physics-bounded angle of arrival continues that pattern, method 2300 proceeds to step 2316. In step 2316, the estimated angle of arrival is determined to be the physics-bounded angle of arrival.

Many of methods and systems have been described with reference to the embodiment in which the received electromagnetic signal includes a BT packet. In alternate embodiments, the received electromagnetic signal can include packets that conform to other protocols. For example, the received electromagnetic signal can include packets that conform to the WiMAX protocol.

V. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for estimating an angle of arrival, comprising:
a snapshot determining module configured to receive a signal from each antenna of an antenna array and to generate a snapshot vector including values based on the signals, wherein each signal is representative of an electromagnetic signal incident on a respective antenna of the antenna array, wherein each value is representative of a phase delay of a respective signal, and wherein the snapshot determining module comprises:
a joint estimator configured to estimate a modulation index and a frequency offset of the electromagnetic signal based on a phase of the electromagnetic signal and a bit pattern of a first portion of each of the signals; and
a derotator configured to, based on the estimated modulation index and the estimated frequency offset, derotate a second portion of each of the signals to generate each of the values; and
an angle of arrival processing module configured to estimate an angle of arrival for the electromagnetic signal relative to the antenna array based on the snapshot vector.

2. The system of claim 1, further comprising:
a switch configured to receive each of the signals as inputs and to output one of the signals, wherein the snapshot determining module is configured to change an output of the switch between the signals.

3. The system of claim 1, wherein the electromagnetic signal comprises a Bluetooth packet.

4. The system of claim 1, wherein:
the antenna array is a first antenna array and each of the signals are first signals, and
the snapshot determining module is further configured to receive a second signal from each antenna of a second antenna array.

5. The system of claim 4, wherein:
the snapshot vector is a first snapshot vector,
each of the second signals is representative of the electromagnetic signal incident on a respective antenna of the second antenna array,
the snapshot determining module is further configured to generate a second snapshot vector including values, each value of the second snapshot vector being indicative of a phase delay of a respective second signal, and
the angle of arrival processing module is configured to estimate an angle of arrival for the electromagnetic signal relative to the second antenna array based on the second snapshot vector.

6. The system of claim 5, wherein the angle of arrival processing module is configured to determine a position of a transmitter used to transmit the electromagnetic signal based on the angle of arrival for the electromagnetic signal relative to the first antenna array and the angle of arrival for the electromagnetic signal relative to the second antenna array.

7. The system of claim 4, wherein:
the electromagnetic signal is a first electromagnetic signal,
each of the second signals is representative of a second electromagnetic signal incident on a respective antenna of the second antenna array,
the snapshot vector further comprises second values, each second value of the snapshot vector being indicative of a phase delay of the second electromagnetic signal received at a respective antenna of the second antenna array.

8. The system of claim 4, further comprising the first and second antenna arrays.

9. The system of claim 8, wherein the first and second antenna arrays overlap.

10. The system of claim 1, wherein the snapshot determining module comprises an antenna weighting module configured to adjust a weight assigned to each antenna of the antenna array.

11. The system of claim 1, wherein the derotator comprises:
a modulator configured to modulate a set of bits for the second portion of each of the signals; and
a data removing module configured to remove data from the second portion of each of the signals based on each of the sets of modulated bits.

12. The system of claim 11, further comprising an integrator configured to compute a product of each set of modulated bits with a second portion of a respective one of the signals to generate the values.

13. The system of claim 12, wherein the data removing module is further configured to average each of the products over a period to generate the values.

14. The system of claim 13, wherein the period is approximately 3 μs.

15. The system of claim 11, wherein the derotator further comprises:
a demodulator configured to demodulate the second portion of each of the signals; and
a decoder configured to decode each of the demodulated second portions to generate each of the sets of bits.

16. The system of claim 11, further comprising a memory that stores each of the sets of bits.

17. The system of claim 1, wherein the angle of arrival processing module comprises a relative phase delay determination module configured to determine relative phase delays between each signal and all of the other signals.

18. The system of claim 17, wherein the relative phase delay determination module is further configured to receive the snapshot vector and compute a covariance matrix as a product of the snapshot vector and a transpose of the snapshot vector.

19. The system of claim 1, wherein the angle of arrival processing module comprises a smoothing module configured to filter out noise.

20. The system of claim 19, wherein the smoothing module is configured to use a Kalman filter to filter out the noise.

21. The system of claim 1, wherein the angle of arrival processing module comprises a spatial smoothing module configured to reduce a coherence between different reflections of the electromagnetic signal.

22. The system of claim 1, wherein the angle of arrival processing module comprises an angle power spectrum estimator configured to generate an angular power spectrum and to determine an instantaneous angle of arrival for the electromagnetic signal as an angle in the range of angles for which the angular power spectrum is highest.

23. The system of claim 22, wherein the angle power spectrum estimator is configured to use a Fast Fourier Transform to generate the angular power spectrum.

24. The system of claim 1, wherein the angle of arrival processing module comprises a tracking module configured to estimate the angle arrival based on an instantaneous angle of arrival and a past estimated angle of arrival.

25. The system of claim 24, wherein the tracking module is further configured to compute a bound angle based on the past estimated angle of arrival and to estimate the angle of arrival as the bound angle if the instantaneous angle of arrival exceeds the bound angle.

26. The system of claim 1, wherein the electromagnetic signal is a first electromagnetic signal, wherein the electromagnetic signal was transmitted from a first transmitter, and wherein the angle of arrival processing nodule comprises a tracking module configured to estimate the angle arrival based on an estimated angle of arrival of a second electromagnetic signal that was transmitted from a second transmitter.

27. The system of claim 26, wherein the tracking module is further configured to determine whether an instantaneous angle of arrival corresponding to the first electromagnetic signal indicates that the first transmitter is approaching the second transmitter.

28. A method for estimating an angle of arrival, comprising:
receiving a signal from each antenna of an antenna array;
generating a snapshot vector including values based on the signals, wherein each signal is representative of an electromagnetic signal incident on a respective antenna of the antenna array, wherein each value is representative of a phase delay of a respective signal, wherein generating comprises:
estimating a frequency offset and a modulation index of the electromagnetic signal and a bit pattern of a first portion of each of the signals; and
derotating, based on a modulation index and the estimated frequency offset, a second portion of each of the signals to generate each of the values; and
estimating an angle of arrival for the electromagnetic signal relative to the antenna array based on the snapshot vector.

29. The method of claim 28, further comprising:
switching an output of a switch between the signals.

30. The method of claim 28, wherein the electromagnetic signal comprises a Bluetooth packet.

31. The method of claim 28, wherein the antenna array is a first antenna array and each of the signals are first signals, further comprising:
receiving a second signal from each antenna of a second antenna array.

32. The method of claim 31, wherein the snapshot vector is a first snapshot vector and each of the second signals is representative of the electromagnetic signal incident on a respective antenna of the second antenna array, further comprising:
generating a second snapshot vector including values, each value of the second snapshot vector being indicative of a phase delay of a respective second signal, and
estimating the angle of arrival for the electromagnetic signal relative to the second antenna array.

33. The method of claim 32, further comprising:
determining a position of a transmitter used to transmit the electromagnetic signal based on the angle of arrival for the electromagnetic signal relative to the first antenna array and the angle of arrival for the electromagnetic signal relative to the second antenna array.

34. The method of claim 31, wherein the electromagnetic signal is a first electromagnetic signal and each of the second signals is representative of a second electromagnetic signal incident on a respective antenna of the second antenna array, further comprising:

generating second values, each second value being representative of a phase delay of a respective one of the second signals, wherein the snapshot vector further comprises the second values.

35. The method of claim 28, further comprising:
adjusting a weight assigned to each antenna of the antenna array.

36. The method of claim 28, wherein derotating comprises:
modulating a set of bits for each second portion of each of the signals; and
removing data from the second portion of each of the signals to generate each of the values using each of the set of bits.

37. The method of claim 36, wherein removing comprises:
computing a product of each set of modulated bits with a second portion of a respective one of the signals.

38. The method of claim 37, wherein generating comprises:
averaging each of the products over a period to generate the values.

39. The method of claim 36, wherein derotating comprises:
demodulating the second portion of each of the signals; and
decoding each of the demodulated second portions to generate each of the sets of bits.

40. The method of claim 36, further comprising:
storing each of the sets of bits.

41. The method of claim 28, wherein estimating comprises determining relative phase delays between each signal and all of the other signals.

42. The method of claim 41, wherein determining comprises computing a covariance matrix as a product of the snapshot vector and a transpose of the snapshot vector.

43. The method of claim 28, wherein estimating comprises filtering out noise using a Kalman filter.

44. The method of claim 28, wherein estimating the angle of arrival comprises reducing a coherence between different reflections of the electromagnetic signal.

45. The method of claim 28, wherein estimating comprises:
generating an angular power spectrum; and
determining an instantaneous angle of arrival for the electromagnetic signal as an angle in the range of angles for which the angular power spectrum is highest.

46. The method of claim 45, wherein estimating comprises:
using a Fast Fourier Transform to generate the angular power spectrum.

47. The method of claim 28, wherein estimating comprises:
estimating the angle arrival based on an instantaneous angle of arrival and at least one past estimated angle of arrival.

48. The method of claim 47, wherein estimating the angle of arrival comprises:
computing a bound angle based on the at least one past estimated angle of arrival; and
estimating the angle of arrival as the bound angle if the instantaneous angle of arrival exceeds the bound angle.

49. The method of claim 28, wherein the electromagnetic signal is a first electromagnetic signal, wherein the first electromagnetic signal was transmitted from a first transmitter, and wherein estimating further comprises:
estimating the angle arrival based an estimated angle of arrival of a second electromagnetic signal that was transmitted from a second transmitter.

50. The method of claim 49, wherein estimating comprises:
determining whether an instantaneous angle of arrival corresponding to the first electromagnetic signal indicates that the first transmitter is approaching the second transmitter.

51. The system of claim 3, wherein the first portion of each of the signals comprises a sync portion of each of the signals.

* * * * *

UNITED STATES PATENT AND TRADEMARK OFFICE
CERTIFICATE OF CORRECTION

| | |
|---|---|
| PATENT NO. | : 8,797,213 B2 |
| APPLICATION NO. | : 12/895497 |
| DATED | : August 5, 2014 |
| INVENTOR(S) | : Pun et al. |

Page 1 of 1

It is certified that error appears in the above-identified patent and that said Letters Patent is hereby corrected as shown below:

In the Claims

Column 21, line 66, replace "the angle arrival" with --the angle of arrival--.

Column 22, line 9, replace "processing nodule" with --processing module--.

Column 22, line 10, replace "the angle arrival" with --the angle of arrival--.

Signed and Sealed this
Eleventh Day of November, 2014

Michelle K. Lee
*Deputy Director of the United States Patent and Trademark Office*